(12) United States Patent
Xu

(10) Patent No.: US 9,044,039 B2
(45) Date of Patent: Jun. 2, 2015

(54) EDIBLE PET CHEW AND METHOD FOR MAKING THE SAME

(71) Applicant: Shanghai Sunlight Electronic Weighting Apparatus Co., Ltd., Shanghai (CN)

(72) Inventor: Guangqiang Xu, Shanghai (CN)

(73) Assignee: SHANGHAI SUNLIGHT ELECTRONIC WEIGHING APPARATUS CO., LTD., Shanghai (CN)

( * ) Notice: Subject to any disclaimer, the term of this patent is extended or adjusted under 35 U.S.C. 154(b) by 0 days.

(21) Appl. No.: 14/289,610

(22) Filed: May 28, 2014

(65) Prior Publication Data

US 2014/0255553 A1 Sep. 11, 2014

Related U.S. Application Data

(63) Continuation-in-part of application No. 13/052,113, filed on Mar. 21, 2011, now Pat. No. 8,776,728, and a continuation-in-part of application No. 14/059,420, filed on Oct. 21, 2013.

(51) Int. Cl.
| | |
|---|---|
| *A01K 29/00* | (2006.01) |
| *A23K 1/00* | (2006.01) |
| *A23K 1/10* | (2006.01) |
| *A23K 1/14* | (2006.01) |
| *A23K 1/16* | (2006.01) |
| *A23K 1/18* | (2006.01) |

(52) U.S. Cl.
CPC . *A23K 1/003* (2013.01); *A23K 1/10* (2013.01); *A23K 1/106* (2013.01); *A23K 1/14* (2013.01); *A23K 1/1631* (2013.01); *A23K 1/1643* (2013.01); *A23K 1/1853* (2013.01)

(58) Field of Classification Search
USPC ................ 119/709, 710, 711, 702, 707, 174; 426/635, 641, 805
See application file for complete search history.

(56) References Cited

U.S. PATENT DOCUMENTS

| | | | | |
|---|---|---|---|---|
| 2,988,045 | A * | 6/1961 | Fisher | 119/709 |
| 5,673,653 | A * | 10/1997 | Sherrill | 119/709 |
| 7,677,203 | B2 * | 3/2010 | Stern | 119/709 |
| 2007/0289552 | A1 * | 12/2007 | Axelrod et al. | 119/710 |
| 2011/0262587 | A1 * | 10/2011 | Stern et al. | 426/5 |
| 2011/0283955 | A1 * | 11/2011 | Axelrod et al. | 119/710 |
| 2012/0079992 | A1 * | 4/2012 | Chen et al. | 119/710 |

* cited by examiner

*Primary Examiner* — Trinh Nguyen
(74) *Attorney, Agent, or Firm* — Raymond Y. Chan; David and Raymond Patent Firm

(57) ABSTRACT

An edible pet chew has a member of meat based material. As a first aspect of present invention, the edible pet chew has a chewy sheet of meat based material. As another aspect, the edible pet chew has a meat based material chewy sheet member and additionally an edible material member being wrapped therein. As another aspect, the edible pet chew has an edible material member and additionally a meat based material chewy sheet member being wrapped therein. As another aspect, the edible pet chew has a THREE-DIMENSIONAL-SHAPE meat based material member and additionally an edible material member wrapped therein. As another aspect, the edible pet chew has an edible material member and additionally a THREE-DIMENSIONAL-SHAPE meat based material member wrapped therein. Other aspects of present invention provide a method for making the edible pet chew with the essential member of meat based material chewy sheet member or THREE-DIMENSIONAL-SHAPE member.

27 Claims, 13 Drawing Sheets

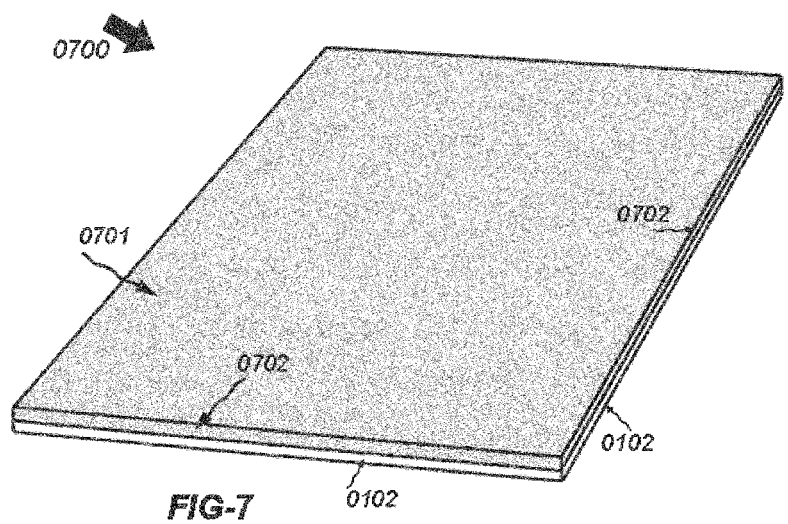
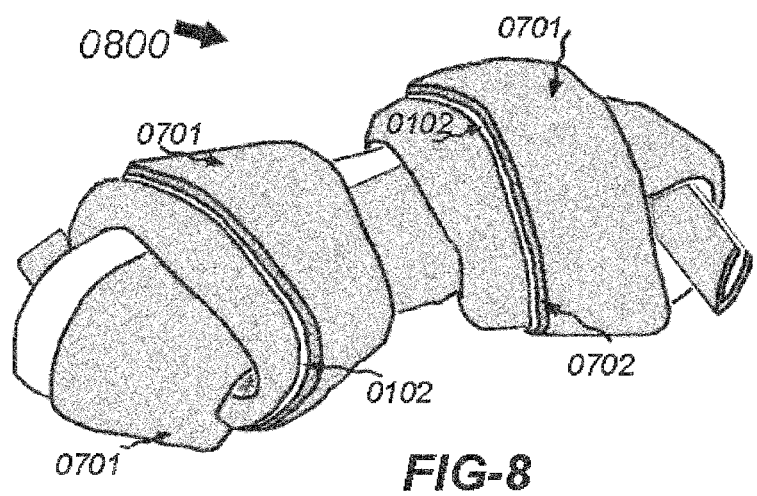

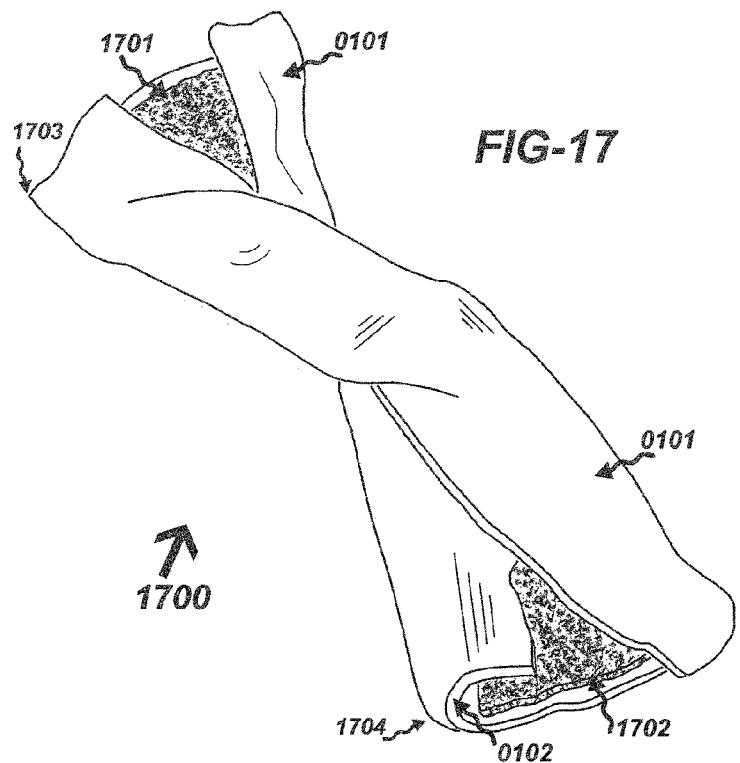
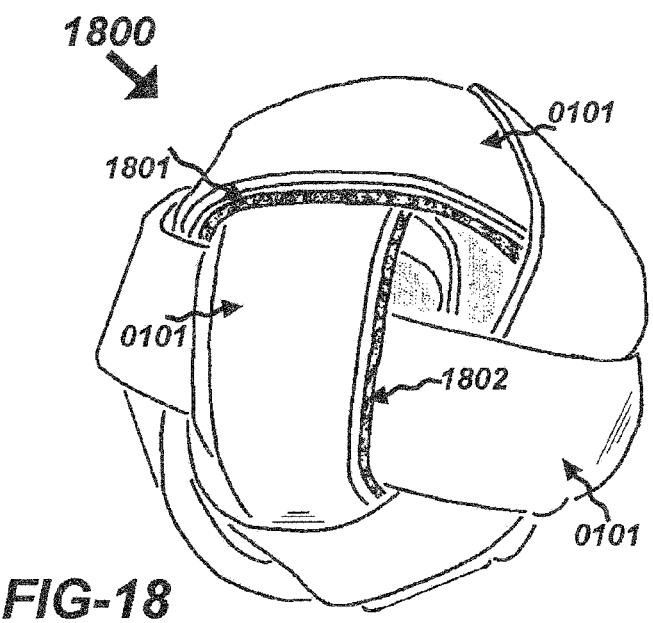

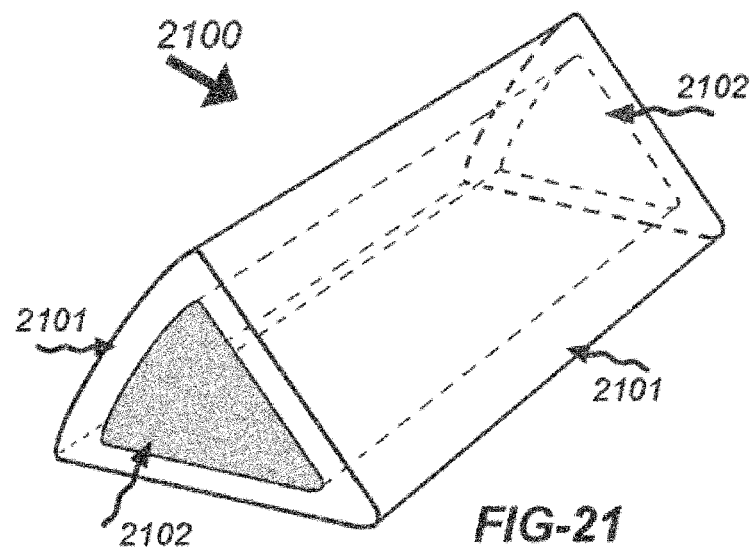
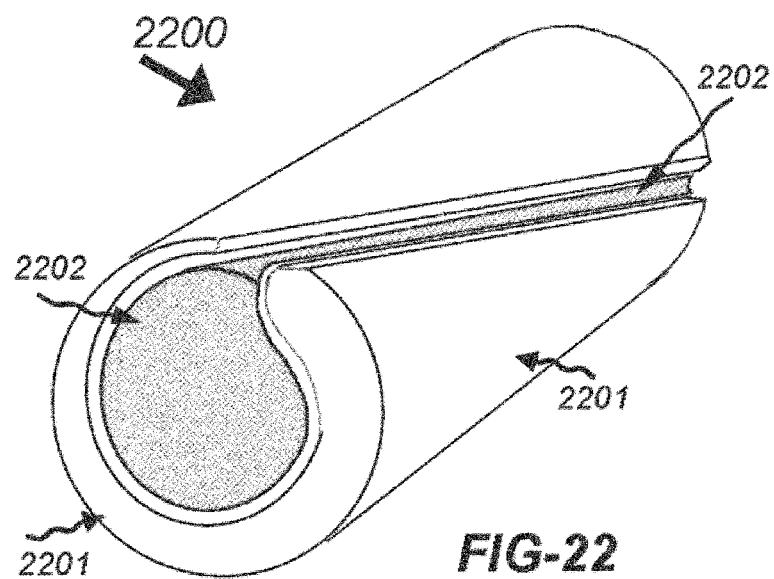

FIG-25

| Palatability Test conducted | |
|---|---|
| Meat ingredient percentage (by weight on as formulated basis in the meat based material member) | The number of dogs out of 40 testing dogs* prefers Diet A** instead of Diet B*** |
| 15% | 28 |
| 20% | 29 |
| 25% | 29 |
| 30% | 30 |
| 33.3% | 36 |
| 35% | 33 |
| 40% | 34 |
| 45% | 36 |
| 50% | 35 |
| 60% | 37 |
| 75% | 36 |

\* Number of palatability testing dogs for every run of testing- 40 dogs
\*\* Diet A- edible pet chew consisting of meat based material member with various meat ingredient percentages (removing the help of artificial flavor enhancer)
\*\*\* Diet B- edible pet chew consisting of plaint based material member free of meat ingredient (removing the help of artificial flavor enhancer).

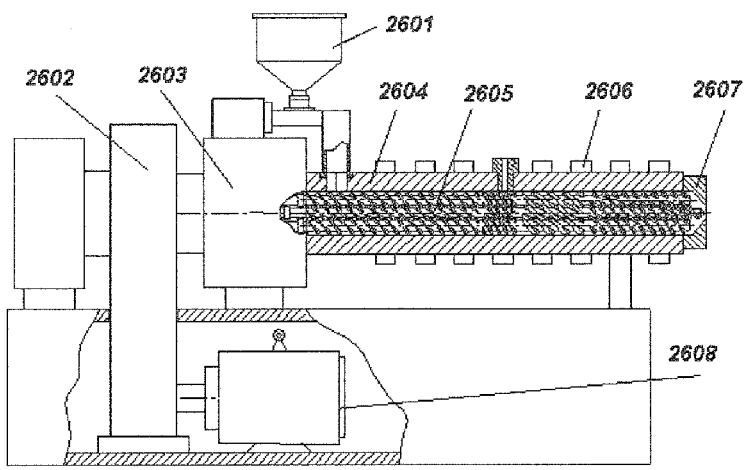

FIG-26

EDIBLE PET CHEW AND METHOD FOR MAKING THE SAME

CROSS REFERENCE OF RELATED APPLICATION

This is a CIP application that claims the benefit of priority under 35 U.S.C. §119 to a non-provisional application, application Ser. No. 13/052,113, filed Mar. 21, 2011 and to an EPO patent application No. 12184539.0-1221, filed Sep. 14, 2012, and to a non-provisional application, application Ser. No. 14/059,420, filed on Oct. 21, 2013.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The field of this invention relates to an Edible Pet Chew and a method for making the edible pet chew.

2. Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time, being distinguished from "pet treats". "Pet treats" are intended to be chewed by a pet/dog for a relatively short period of time and digested.

One existing important category of a typical Edible "Pet Chew" is the ones that are made of animal skin, for example Rawhide/Porkhide sheet. Of these types of pet chew, "rawhide sheet" is a commonly used material which is thin, chewy, malleable and long-lasting for chewing. With these excellent properties/characteristics, "rawhide sheet" is extremely extensively used to produce dog chews in existing market creating thousands of "rawhide" dog chew products. One specific such pet chew is disclosed in U.S. Pat. No. 2,988,045 to Fisher. This pet chew includes a rolled and knotted sheet of rawhide resembling a bone shape. To make the bone shape, a sheet of wet rawhide is rolled into a cylindrical form, and while the rawhide is still wet, two the ends are knotted to simulate an animal joint. Then the rolled and knotted rawhide is dried and hardened.

Pet Chew consisting solely of rawhide/porkhide sheets may be chewed for sufficient long time and can be digested. However, many dogs find these pet chews lack of substantial flavor and scent. Accordingly, many dogs lose interest with these rawhide pet chews after a while and will at most only chew on them for short periods of time. Some existing products consisting solely of rawhide/porkhide are improved by adding additional flavorings, for example artificial peanut flavor, into the rawhide after it is hardened, but it cannot improve the palatability of rawhide significantly.

U.S. Pat. No. 5,673,653 discloses an edible pet chew wrapping jerky with rawhide, so as to attract pets to chew. It finds a good way to make the pet chews made of rawhide/porkhide sheet quite attractive to pets/dogs, improving its palatability to pets. But since it still has a big member of rawhide/porkhide in the finished products as outer layer, it unfortunately is not thought to overcome the other two disadvantages that rawhide/porkhide have as described below.

The other two disadvantages of Pet Chew formed from solely or substantially rawhide/porkhide are as follows. Firstly, environmental pollution. It is concerned by many people that manufacture of rawhide is relatively unregulated industry. Producing the raw material of rawhide is known to use a bunch of chemicals and therefore generate evident pollution during its splitting, cleaning, washing and bleaching processes. The water system may also be harmed and polluted accordingly. Secondly, detrimental residues in rawhide from primary processing. When primarily processing rawhide, lime solution, NH4CL, H2O2, and NaOH may be used during its splitting, cleaning, washing and bleaching processes and may remain in some finished products more or less. These chemicals are not good for pets' health. For example, excessive H2O2 will cause pets vomit or even worse symptom. What's more, heavy metals, for example lead may also remain in the rawhide and accumulate in the body, which cause serious damage to the pets' health. These concerns encourage a perception for pets/dogs owners to look for alternative ways to provide a "pet chew" for a pet without the use of rawhide/porkhide.

The U.S. Pat. No. 5,673,653 has another disadvantage regarding the member of "traditional jerky" or "kippered jerky" wrapped inside the rawhide sheet. The disadvantage is, U.S. Pat. No. 5,673,653 fails to teach the "traditional jerky" or "kippered jerky" is a meat based sheet member processed with an improved formula and/or by a specific process, wherein the formula and process are intended to achieve good malleability, rigidity, strength and durability of the meat based sheet to simulate the malleability, rigidity, strength and durability of the property/characteristics/chewing functions of traditional rawhide/porkhide sheets (the rawhide/porkhide sheets is for making dog chew products). The "traditional jerky" or "kippered jerky" prepared by the patent isn't chewy at all and is found to be brittle creating a lot of fragment of jerky inside sales package which isn't valuable for consumers. Due to this disadvantage, the dog chew products disclosed by U.S. Pat. No. 5,673,653 only has the outer layer rawhide member chewy. The "traditional jerky" or "kippered jerky" wrapped inside isn't intended to serve as a chewy member for dogs to chew on for an extended time as rawhide sheet member does. It only serves as an attractant rather than an additional chewy member.

In another category of "pet treat", there are animal meat product lines, typically, chicken jerky, pork jerky and beef jerky, which are substantially made of meat ingredients. It is known to all that pets, primarily dogs welcome meat jerky very much. The range may cover dried products, including animal meat, such as chicken, pork, beef, duck meat, goose, turkey meat, poultry meat, fish and animal pizzle, animal viscera, such as liver, lung, and heart, etc. Typical processing of meat jerky is, simply obtain meat from slaughtered animals, add additives (for example salt, sugar, plant protein and preservatives), then dry it. However, one disadvantage of these jerky products is, after meat being obtained from animals, the meat is not formulated properly and/or is not processed properly before making the finished meat products, and therefore the materials don not present good rigidity, durability and strength for dogs' long time chewing. Either the materials do not present good malleability to form a pet chew product. As a result, the finished products have limited shapes/forms/structure and can not be formed into various shapes (for example shape of sheet like a rawhide sheet) welcome by the pets or the pet owners. Some of these jerky products are made of ground meat added with simple additives (for example salt, sugar), being shaped with a mold thin enough looking like a "sheet". But the manufacturers fail to learn to follow a proper formula and/or process to form the "sheet". As a consequence, these "sheets" do not have the essential properties/characteristics that "rawhide" has. These jerky sheets are fragile, crisp, and not chewy, unlike rawhide. Therefore manufacturers do not use them to form the finished products that "rawhide sheet" is always formed to. Another disadvantage is, these meat lines are always classified as "pet treat", which means they are intended to be chewed by a pet/dog for a relatively short period of time before being fully digested, unlike "pet chews".

U.S. Pat. No. 7,677,203 discloses an edible pet chew against U.S. Pat. No. 5,673,653, replacing the rawhide with a "plant based" material sheet with over 50% plant material, so as to avoid pollution and health damage. However, since dogs are carnivorous, the plant based material does not attract pets very much. Although flavoring can be added into the material, the plant based sheet member of the edible pet chew is still less attractive to dogs due to too high plant percentage (over 50%) existing in the formula, since dogs do not prefer vegetal material. It results the plant based sheet member of the edible pet chew products lack of inherent attraction to dogs. Furthermore, compared to plant based food, bodies of pets, especially dogs, more fit nutrition provided by animal based food, and their digestive system more fits animal based food, such as meat. Therefore, the "plant based" edible pet chew with over 50% plant ingredients is not considered to be so sufficient to pets' health. Another disadvantage is, the U.S. Pat. No. 7,677,203 fails to teach the "plant based sheet" is the one processed by a specific process, wherein the process is intended to achieve good malleability, rigidity, strength and durability of the plant based sheet to simulate the malleability, rigidity, strength and durability of the property/characteristics/chewing functions of traditional rawhide/porkhide sheets (the rawhide/porkhide sheets is for making dog chew products).

Another existing pet chew made from plant material is the one made from a molded wheat based material with glycerin, gelatin, monoglycerides of edible fatty acid and natural flavor with three-dimensional-shape. It also contains chlorophyll intending to improve dogs' breath. This molded plant material composition is molded into an elongated shape with one end shaped like a toothbrush head and an opposite end shaped like an epiphysis i.e. end of a long bone. However, this pet chew formed from main ingredients of plant also has the same disadvantages as U.S. Pat. No. 7,677,203 does.

U.S. application Ser. No. 12/925,509, filed Oct. 22, 2010, disclosed an edible pet chew comprising an outer layer and an inner layer. The outer layer comprises 28-49% plant based material, at least 30% meat based material and at least 20% animal hide based material. The first disadvantage of the application Ser. No. 12/925,509 is that, the application fails to teach how much meat and plant ingredient exactly existing in the outer layer member since verbiages of "plant based material" and "meat based material" are vague ones to describe an ingredient. The second disadvantage of the application is that, the outer layer contains too high percentage animal hide based material, as much as at least 20%. The too high percentage animal hide based material brings significant disadvantage concerns of rawhide material as described at above Paragraphs. To put it simply, environmental harm when processing rawhide, detrimental residues in finished products. The too high percentage animal hide based material will result in the outer layer having a surface with roughness or bumps or ridges or irregularities, which isn't visually attractive for dog chew consumers. The third disadvantage of the application is that, it introduced a member of outer layer only rather than a "sheet" member, which makes it fail to simulate the sheet shape of traditional popular rawhide/porkhide sheet dog chew and thus not visually attractive as rawhide/porkhide sheet is. The fourth disadvantage of the application is, the application Ser. No. 12/925,509 fails to teach the "outer layer" is the one processed by a specific heating process before its being extruded at the extruder die, wherein the process is intended to achieve good malleability, rigidity, strength and durability of the outer layer to simulate the malleability, rigidity, strength and durability of the property/characteristics/chewing functions of traditional rawhide/porkhide sheets (the rawhide/porkhide sheets is for making dog chew products). The fifth disadvantage of the application is that, the application Ser. No. 12/925,509 merely teaches the pet chew must be in two layer structure. It fails to teach a pet chew with merely a single sheet. Compared to the single sheet constitution, disadvantages of two sheet or two layer constitution are, it requires more labor to have the second sheet wrapped in the product and requires additional materials to make the second sheet, which isn't cost economical.

Accordingly, what is needed is an edible pet chew to overcome the problems and disadvantages of the prior arts.

SUMMARY OF THE PRESENT INVENTION

An objective of the present invention is to provide an edible pet chew with a long-lasting chewy sheet simulating the sheet shape of traditional popular rawhide/porkhide sheet as a dog chew member and replacing the traditional rawhide/porkhide sheet member.

An objective of the present invention is to provide an edible pet chew with a long-lasting chewy sheet simulating the various quality characteristics of traditional popular rawhide/porkhide sheet as a dog chew member and replacing the traditional rawhide/porkhide sheet member. The known rawhide sheet member refers to a most popularly used material in the existing market for manufacturing dog chew products. The rawhide sheet material is generally obtained by the following process: slaughter a cattle, separate cattle skin from the cattle, split the skin to a number of layers, soak the split skin layers in lime solution, wash and bleach the skins in rolling drums, and dry the skin layers to a moisture content less than 30%. Typical thickness of the rawhide sheet material is in a range between 0.1 mm to 5 mm (more typically 0.5 mm to 2.5 mm. The rawhide is typically flat in surfaces with generally consistent thickness at every area of it. The typical tensile strength of the rawhide sheet is at least 0.5 mPa. This kind of rawhide sheet material enjoys very good quality characteristics as a member for dog chew products such as: chewy, long lasting for dog to chew on, very good strength, very good durability and sheet structure which enables it easily to be structured to various product structures.

An objective of the present invention is to provide an edible pet chew with reduced animal hide ingredient in the products or even without animal hide ingredient.

Another objective of the present invention is to provide an edible pet chew with a long-lasting chewy sheet simulating the malleability and durability property of traditional rawhide/porkhide sheet but being formed from a different material from rawhide/porkhide sheet, and being intended to satisfy dogs' instinctive urge to chew, exercise their jaws and reduce the tartar on teeth of the dogs while chewing it.

Another objective of the present invention is to provide an edible pet chew with a long-lasting chewy sheet intended to be chewy and durable for chewing by a pet/dog.

Another objective of the present invention is to provide an edible pet chew with a long-lasting chewy sheet intended to simulate the sheet shape of traditional popular rawhide/porkhide sheet dog chews and thus make it visually attractive as rawhide/porkhide sheet is.

Another object of the present invention is to provide an edible pet chew with a chewy sheet replacing the traditional rawhide sheet member that dog chew commonly utilizes, which is processed in a friendly pattern to the environment, so that reduced pollution is produced during processing.

Another object of the present invention is to provide an edible pet chew with a chewy sheet that can be manipulated to various forms and shapes with the finished products so as to enhance fun for pets/dogs, and provide more attractions and choices for pet owners.

Another objective of the present invention is to provide an edible pet chew with a "meat based material" chewy sheet that has meat and plant ingredient in its formula, which is long-lasting for pets to chew on for a substantially long time before ingesting it.

Another objective of the present invention is to provide an edible pet chew with a "meat based material" chewy sheet that has considerable meat content in the formula and plant ingredient in its formula, wherein the "meat based material" sheet member provides inherent strongly-attractive taste, scent and smell to dogs, and thus continuously encourages them to chew on.

An objective of the present invention is to provide an edible pet chew with a "meat based material" chewy sheet that has considerable meat content in the formula and thus fits digestive system of the pets, so that the pets can obtain sufficient nutrition from the edible pet chew.

Another objective of the present invention is to provide an edible pet chew with a "meat based material" chewy sheet. The sheet form is obtained by extruding a "meat based material" composition with an extruder and the "meat based material" composition is treated by heating before its being extruded at the extruder die, so as to achieve the "chewy" property of the "meat based material" sheet.

An objective of the present invention is to provide an edible pet chew with a long-lasting THREE-DIMENSIONAL-SHAPE chewy member simulating the various quality characteristics of traditional popular rawhide/porkhide sheet as a dog chew member.

Another objective of the present invention is to provide an edible pet chew with a long-lasting THREE-DIMENSIONAL-SHAPE chewy member intended to be chewy and durable for chewing by a pet/dog.

Another objective of the present invention is to provide an edible pet chew with a "meat based material" THREE-DIMENSIONAL-SHAPE chewy member that has meat and plant ingredient in its formula, which is long-lasting for pets to chew on for a substantially long time before ingesting it.

Another objective of the present invention is to provide an edible pet chew with a "meat based material" THREE-DIMENSIONAL-SHAPE chewy member that has considerable meat content in the formula and plant ingredient in its formula, wherein the "meat based material" sheet member provides inherent strongly-attractive taste, scent and smell to dogs, and thus continuously encourages them to chew on.

An objective of the present invention is to provide an edible pet chew with a "meat based material" THREE-DIMENSIONAL-SHAPE chewy member that has considerable meat content in the formula and thus fits digestive system of the pets, so that the pets can obtain sufficient nutrition from the edible pet chew.

Another objective of the present invention is to provide an edible pet chew with a "meat based material" THREE-DIMENSIONAL-SHAPE chewy member. The three-dimensional-shape form is obtained by extruding a "meat based material" composition with an extruder and the "meat based material" composition is treated by heating before its being extruded at the extruder die, so as to achieve the "chewy" property of the "meat based material" member.

In one aspect of the present invention, the edible pet chew includes a chewy sheet of "meat based material". The "meat based material" includes at least 33.3% meat ingredient by weight on an "as formulated" basis, and less than 50% (more typically 15%-50%) plant ingredient by weight.

In another aspect of the present invention, the edible pet chew includes a first member of "meat based material" sheet and a second member of edible material wrapped in or positioned in the first member. The "meat based material" includes at least 33.3% meat ingredient by weight on an "as formulated" basis, and less than 50% (more typically 15%-50%) plant ingredient by weight.

In another aspect of the present invention, the edible pet chew includes a first member of "edible material" and a second member of "meat based material" sheet, wherein the second member is wrapped in or positioned in the first member, wherein the first member is free of plant based material sheet. The "meat based material" includes at least 33.3% meat ingredient by weight on an "as formulated" basis, and less than 50% (more typically 15-50%) plant ingredient by weight.

In another aspect of the present invention, it provides a process for forming an edible pet chew with a "meat based material" chewy sheet. The process includes:

(A). Prepare fresh meat or frozen meat with inherent moisture content between 65%-85%. Dry the fresh meat or frozen meat to dried meat with moisture content <16%. Grind the dried meat to meat meal with moisture content <16%. This step is done by a meat raw material supplier which supplies the meat to the edible pet chew manufacturer.

(B). Form a "meat based material" composition with the meat meal, wherein the meat based material composition comprises at least 33.3% meat ingredient by weight on an "as formulated" basis and <50% plant ingredient by weight.

(C). Deliver the composition into an extruder, and heat the composition in the extruder at a high temperature at least 40° C. before its being extruded at the extruder die to a sheet form. Extrude the composition with the extruder. After the composition leaves from the extruder die, a sheet of "meat based material" is formed. The typical thickness of the sheet ranges from 0.1 mm to 5 mm.

(D). Form the sheet to a structure of a finished dog chew product. Preferably the sheet is assembled with another edible material member to form the structure of the finished dog chew product.

(E). Dry and harden the product by heating for a sufficient time and obtain a final finished dog chew product. Moisture of the sheet member in final finished products is 8%-18%.

All the four aspects above paragraphs mentioned have a common element that, the edible pet chew includes a member of "meat based material" chewy sheet.

In yet another aspect of the present invention, the edible pet chew includes a first THREE-DIMENSIONAL-SHAPE chewy member of "meat based material" and a second member of edible material wrapped in or positioned in the first member. The "meat based material" includes at least 33.3% meat ingredient by weight on an "as formulated" basis, and less than 50% (more typically 15%-50%) plant ingredient by weight.

In another aspect of the present invention, the edible pet chew includes a first member of "edible material" and a second THREE-DIMENSIONAL-SHAPE chewy member of "meat based material", wherein the second member is wrapped in or positioned in the first member, wherein the first member is free of plant based material member. The "meat based material" includes at least 33.3% meat ingredient by weight on an "as formulated" basis, and less than 50% (more typically 15%-50%) plant ingredient by weight.

In another aspect of the present invention, it provides a process for forming an edible pet chew with a "meat based material" THREE-DIMENSIONAL-SHAPE chewy member. The process includes:

(A). Prepare fresh meat or frozen meat with inherent moisture content between 65%-85%. Dry the fresh meat or frozen meat to dried meat with moisture content <16%. Grind the dried meat to meat meal with moisture content <16%. This step is done by a meat raw material supplier which supplies the meat to the edible pet chew manufacturer.

(B). Form a "meat based material" composition with the meat meal, wherein the meat based material composition comprises at least 33.3% meat ingredient by weight on an "as formulated" basis and <50% plant ingredient by weight. Form another "edible material" composition.

(C). Deliver the "meat based material" composition and the "edible material" composition into a co-extrusion extruder, and heat the compositions in the extruder at a high temperature at least 40° C. before their being extruded at the extruder die to a three-dimensional form. Extrude the compositions with the extruder.

(D). Divide the extruded material to pre-determined smaller sized ones with finished pet chew product form.

(E). Dry and harden the product by heating for a sufficient time and obtain a final finished dog chew product. Moisture of the "meat based material" member in final finished products is 8%-18%.

All the three aspects above paragraphs mentioned have a common element that, the edible pet chew includes a "meat based material" THREE-DIMENSIONAL-SHAPE chewy member.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

Reference now is made to the accompanying drawings in which:

FIG. 7 is a top plan view of a co-extruded two layer structured material with a layer of "edible material" and another layer of "meat based material". This two layer structured material is prepared for further forming to embodiments of an edible pet chew.

FIG. 8 is an elevational view of an embodiment of a pet chew formed from a two layer structured material with a layer of "edible material" and another layer of "meat based material".

FIG. 15 is an elevational view of another embodiment of a pet chew in twist stick shape formed from a predetermined-sized "meat based material" chewy sheet cut from the large chewy sheet of FIG. 1, wrapping a stick-shaped "edible material" member in.

FIG. 16 is an elevational view of another embodiment of a pet chew in twist stick shape formed from a predetermined-sized "meat based material" chewy sheet cut from the large chewy sheet of FIG. 1, wrapping three individual pieces of "edible material" members in.

FIG. 17 is an elevational view of another embodiment of a pet chew formed from a predetermined-sized "meat based material" chewy sheet cut from the large chewy sheet of FIG. 1, resembling a bow tie, wrapping two individual pieces of "edible material" members in.

FIG. 18 is an elevational view of another embodiment of a pet chew assembled with a few pieces of predetermined-sized "meat based material" chewy sheets cut from the large chewy sheet of FIG. 1, resembling a ball shape, wrapping four individual pieces of "edible material" members appealing to pets in.

FIG. 19 is an elevational view of another embodiment of a pet chew formed from a predetermined-sized "meat based material" chewy sheet cut from the large chewy sheet of FIG. 1, in a retriever roll shape. The chewy sheet is rolled and pressed, wrapping three individual pieces of "edible material" members in.

FIG. 20 is an elevational view of another embodiment of a pet chew in stick shape formed from a predetermined-sized "meat based material" chewy sheet cut from the large chewy sheet of FIG. 1. The chewy sheet is twisted, wrapping a stick-shaped "edible material" member appealing to pets in.

FIG. 21 is a perspective view of an embodiment of a pet chew formed from a three-dimensional-shape chewy member of "meat based material" and another member of "edible material" wrapped by the "meat based material" member, looking like a triangular stick.

FIG. 22 is an elevational view of an embodiment of a pet chew formed from a three-dimensional-shape chewy member of "meat based material" and another member of "edible material" wrapped by the "meat based material" member, looking like a cylindrical stick.

FIG. 25 is a table of palatability test conducted.

FIG. 26 is a drawing of a typical extruder, a machine system for producing pet chew products.

DETAILED DESCRIPTION OF THE PREFERRED EMBODIMENT

Figure 1:
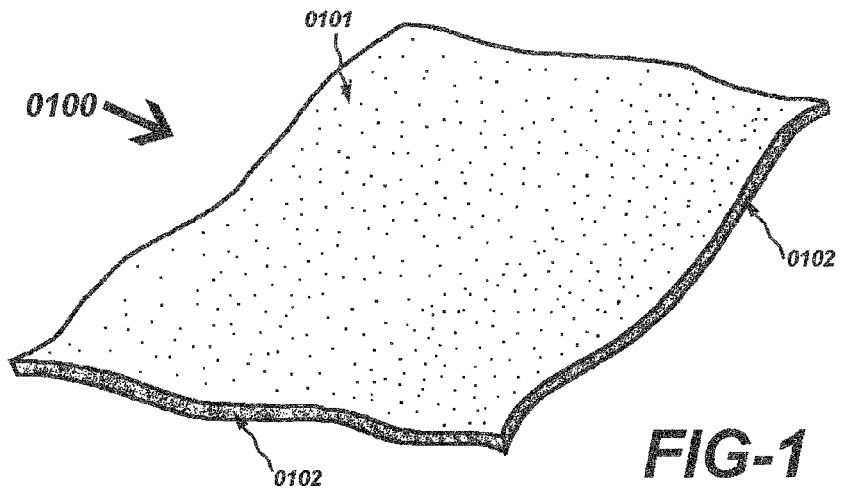
FIG. 1 is a top plan view of a large chewy sheet formed from meat based material preparing to be cut to smaller sheets to form an embodiment of an edible pet chew of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be noted that the term of "formula" or "formulation" as used in present invention refers to a list of the substances used to make a food etc, showing the amounts of each substance that should be used. It should be noted that the term "meat" as used in the present invention is defined as the material selected from (but not limited to) the group consisting of traditional meat, traditional meat by-product, meat derived material and meat by-product derived material. The term "meat" is defined as the material typically selected from the group consisting of: animal flesh, animal muscle, animal fat, poultry meat, chicken, chicken breast, duck, goose, turkey, poultry by product, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart, animal pizzle, meat meal, chicken meal, fish meal, meat by-product meal, poultry by-product meal, meat derived ingredient, poultry derived ingredient, meat by-product derived ingredient and poultry by-product derived ingredient. Alternatively the "meat" is the material selected from the group consisting of animal meat (such as chicken, pork, beef, duck meat, goose, turkey meat, poultry meat, fish), animal pizzle, animal viscera (such as liver, lung, and heart) and animal fat. It also should be noted that the fresh meat and frozen meat in present invention is defined as the material derived from slaughtered animals, with inherent moisture content over 50% (typically 65%-85%) by weight, including fresh or frozen animal meat, meat by-product, poultry meat, poultry by-product. Alternatively, the "meat" includes gelatin, wherein the gelatin is an animal jelly or a glutinous protein obtained from animal tissues such as bone and skin.

It should be noted that the term "traditional meat by-product" in present invention is defined as the material typically selected from the group consisting of: animal fat, porcine meat by-product, poultry by-product, bovine meat by-product, animal viscera, animal stomach, animal tongue, animal kidney, animal intestines, animal spleen, animal liver, animal lung, animal heart, animal pizzle, meat by-product meal, poultry by-product meal, meat by-product derived ingredient and poultry by-product derived ingredient.

It should be noted that the term "traditional meat" is defined as the material typically selected from the group consisting of: animal flesh, animal muscle, poultry meat, chicken, chicken breast, duck, goose, turkey, porcine meat, pork, bovine meat, beef, mutton, lamb, goat meat, fish, meat meal, chicken meal, fish meal, meat derived ingredient and poultry derived ingredient.

It should be noted that the term of "plant" as used in present invention refers to a material typically includes a plant material, a plant derived material, a plant protein and a plant starch.

It should also be noted that the term "animal hide sheet" in present invention is defined as the material selected from the group consisting of: traditional animal hide sheet (typically traditional rawhide sheet) and animal hide based sheet comprising at least 50% animal hide materials (typically rawhide materials) by weight. Preferably the "animal hide sheet" is an animal hide based sheet, wherein the animal hide based sheet is a kind of artificially reprocessed animal hide sheet with over 50% animal hide ingredient. Versus traditional animal hide sheet, animal hide based sheet has advantages of lower cost for producing and easier access to adding attractant ingredient into the sheet interior part. For the "animal hide based sheet", preferably it is an extruded sheet by extruding an animal hide based composition (for example a composition includes animal hide ingredient and plant ingredient in its formula), wherein the sheet includes over 50% animal hide ingredient by weight. "Over 50% animal hide ingredient" in the sheet ensures the animal hide ingredient is the primary ingredient in the sheet. Our tests show that, only when the sheet has "over 50% animal hide ingredient", the animal hide based sheet can achieve a similar durability and strength that traditional animal hide sheet has. Once the proportion of animal hide ingredient in the sheet goes below 50% by weight, a surprisingly quick decrease of durability and strength appears with the sheet. Compared to traditional animal hide sheet, the animal hide based sheet has less animal hide ingredient, providing advantages of less environmental pollution and less risk of heavy metal harmful to dogs' health. Typical examples of the traditional animal hide sheet include: rawhide sheet and porkhide sheet.

In the present invention, an essential member of "meat based material" chewy sheet is created to form an edible pet chew. The "meat based material" chewy sheet is introduced with good malleability and durability, intended to simulate the malleability and durability properties of traditional rawhide sheet or animal hide sheet (the rawhide sheet or animal hide sheet is for making dog chew products). Alternatively, the essential member in present invention is a "meat based material" three-dimensional-shape chewy member, instead of a chewy sheet.

It should be noted that the term "meat based material member" and "meat based material chewy member" is the member including both three-dimensional-shape member and sheet shape member formed from meat based material.

The "meat based material" is disclosed by present invention to have at least 33.3% (or at least ⅓) "meat" ingredient by weight on an "as formulated" basis. The Value of "at least 33.3% meat ingredient" is decided because our tests identify that when meat ingredient percentage in the meat based material member formula goes to larger than specific 33.3%, an absolutely consistent inherent preference to dogs is obtained without the help of any artificial attractant or flavoring enhancer. We conducted palatability contrast tests to determine the percentage of meat ingredient to put into the meat based material to obtain absolutely consistent inherent preference. The Table as shown in FIG. 25 illustrates our findings with the test. The test interprets that when the meat percentage goes up to 33.3% or larger than 33.3%, an absolute preference appears. And the preference is absolutely consistent when the meat percentage stays at >=33.3%. Therefore "at least 33.3%" is determined to be the meat percentage in the formula of the meat based material member of present invention.

"33.3% meat ingredient" is the minimum proportion in the formula to get rid of artificial attractant and flavoring and simultaneously to secure absolutely consistent "good palatability" for the meat based material member. On the contrary, an absolutely consistent attraction to dogs isn't available if meat ingredient is less than 33.3% in the formula. Provided the meat ingredient proportion is less than 33.3% in the formula of the member, in order to acquire strong attraction to dogs to encourage them to continuously chew on the products, additional artificial flavoring/attractant need be introduced to the formula of the meat based material member. It thus incurs a health risk for dogs who consume the product, because artificial flavoring and attractant is viewed as being harmful to dogs to a certain extent. Consequently present invention utilizes "meat ingredient at least 33.3%" in the formula.

It is known that a market-popular pet chew product should include two major factors, i.e. property of "chewy" (durability) and property of "inherently good palatability". "Chewy" means a material that can endure a dog's chewing for a long time before its being ingested. "Good palatability" means a material with inherent attractant to dogs without adding additional artificial flavorings. A market-successful pet chew product is required to have both two properties.

For the "good palatability" concern, meat is a very good ingredient option that can enhance product palatability inherently, but unfortunately meat has a remarkable disadvantage. The disadvantage is that, the higher meat percentage is in the formula of a pet chew product member, the LESS chewy the member in finished product will be. The reason is that, after drying process, the meat ingredient (if the ingredient initially is ground fresh meat) has a nature of getting brittle rather than getting chewy, or the meat ingredient (if the ingredient initially is dried ground meat meal) has a nature of losing strength between each molecule of the meat meal and thus getting weak rather than getting chewy. In other words, meat ingredient generally is the one that reduces the property of "chewy" for a pet chew product, especially when meat ingredient content in a product member goes to a considerable value for example larger than 33.3%.

The more meat there is in a member of a finished product, the more greatly it reduces the "chewy" property of the member. This theory especially applies to a sheet-like member of a pet chew product which includes considerable meat ingredient percentage in its formula, because when the member is in a specific sheet-like structure, it gets even much more difficult to maintain "chewy" property with considerable meat ingredient proportion in the formula. This characteristic of meat ingredient keeps all prior arts and other manufacturers from attempting to make a pet chew product with a meat based member (especially in a SHEET form) having a considerable meat ingredient proportion in the formula for example a proportion of at least 33.3% but simultaneously still maintaining its "chewy" property.

Present invention is surprisingly disclosing that by applying a specific formula (for example 15%-50% plant ingredient in the formula) or specific manufacturing process (for example extruding process), the meat based material sheet member (or meat based material chewy member) can provide "chewy" property and simultaneously inherent "good palatability" property with a considerable meat ingredient proportion in the formula for example a proportion of at least 33.3%.

Our tests disclose that, a formula of the meat based material comprising meat ingredient at least 33.3% (more typically 33.3%-75%) and plant ingredient <50% (more typically 15%-50%) is an optimized one that enables the meat based material sheet (or chewy member) to achieve a good palatability and simultaneously good durability. When plant ingredient is 0.1%-15% in the formula of the meat based material, good durability still is available, however it doesn't perform as good as the meat based material with 15%-50% plant ingredient in the formula.

Our tests also show that, there are at least three major factors that determine the malleability and durability of the "meat based material" chewy member (especially for the member in a sheet form). An intention of present invention is to identify the three major factors, take all of them into account when determining the necessary features of the "meat based material" member, and accordingly disclose an edible pet chew with a "meat based material" chewy member with optimized durability.

A first factor that determines the malleability and durability of the member is the formula of the "meat based material". Our tests indicate that, plant ingredient is an essential one that can achieve good malleability and durability of the member with meat. Meat ingredient its own is not able to achieve malleability and durability for the member. The plant ingredient in the meat based material composition plays an essential role in achieving malleability and durability for the "meat based material" member. The malleability/durability enhancing effect gets more obvious especially when the starch part of the plant ingredient is gelatinized by heat. The more plant in the formula, the better durability the member obtains. However too much plant ingredients in the member will reduce the palatability or attraction of the member significantly. Our tests indicate that in finished product, when plant ingredient being >50% by weight in the member, plant ingredient will be the primary ingredient in the member, which makes the member NOT good in palatability performance and not attractive to dogs. Therefore ">50% plant ingredient in the member" isn't intended to be an option to form the "meat based material" member of the edible pet chew of the present invention. It is disclosed in present invention that a formula with "<50% plant ingredient (more typically 15%-

50%) by weight in the member" is an optimized one to achieve good malleability and durability for the member.

A second factor that determines the malleability and durability of the member is manufacturing process. The "meat based material" composition is preferably formed by extruding by an extruder, wherein the extruder forms the composition to a pre-determined form or structure by extruding. Extruding the composition with an extruder is verified by our tests to be an optimized option as a manufacturing process to achieve satisfying malleability and durability of the sheet.

It's foreseen the person in this art may use a rolling, or injection, or pressing, or molding, or injection molding process to replace the extruding process. However, the malleability/durability quality of the chewy member processed with processes other than extruding is inferior versus the one processed by extruding process.

Now refer to FIG. 26, a drawing of a typical extruder, a machine system for producing pet chew products. The components of the extruder are as follows: 2601—hopper, 2602—reduction gearbox, 2603—power distributor, 2605—screw, 2606—heater, 2607—extruder die and 2608—motor.

A theory of how the extruder (extruding process combined with heat) partially determines the malleability/durability of the member goes like this: The "meat based material" composition is cooked or heated in the extruder firstly. After that, the composition is extruded at the extruder die. Extruder die is a small opening of the extruder. When a large amount of composition is forced to go through the extruder die, the composition gains a pressure. The pressure causes molecules of the composition to associate with each other more tightly, which further helps the member gain more malleability/durability property. The heat changes the property of the various materials of the composition, especially the plant ingredient. Particularly the gelatinization reaction occurring in the starch part of the plant ingredient helps a lot with the malleability/durability property of the "meat based material" chewy member in the end products.

A third factor that determines the malleability and durability of the member is heating treatment that happens in the manufacturing process. The "meat based material" composition preferably is treated by heating to at least 40° C. (more typically 75° C. to 150° C.) before its being extruded at the extruder die. Heating the composition to at least 40° C. (more typically 75° C. to 150° C.) before its being extruded at the extruder die is verified by our tests as an optimized method to achieve the malleability and durability of the member. Our tests also show that any other heat-treatment happening after the "meat based material" composition leaves from the extruder doesn't help the malleability and durability of the member as the heat-treatment during the extruding process does. This invention surprisingly introduces a "meat based material" chewy member as an essential member of an edible pet chew, wherein the chewy member preferably is applied heat treatment (for at least 40° C.) before its being extruded at the extruder die.

A theory of how the heating treatment partially determines the malleability/durability of the meat based material member (especially chewy sheet member) goes like the following. Raw plant does not present a property enhancing malleability/durability for a sheet made of the plant. Particularly due to the intermolecular bonds of starch molecules in the starch part of the raw plant, the raw plant undissolvable in cold water can't work as a sort of binder for the "meat based material" sheet. However, when the starch part is cooked or heated at a particular temperature (the temperature is generally >40° C. and what the particular temperature is depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus gelatinization occurs in the starch which brings the malleability/durability property for the sheet member in end products made of the plant ingredient. (Note: the gelatinization temperature of starch depends upon, for example, plant type and the amount of water present, PH value, types and concentration of salt, sugar, fat and protein in the recipe.) With the plant ingredient, the sheet member of an edible pet chew hence gains malleability/durability property. In a summary, in the extruder, the "meat based material" composition including raw plant ingredient and water is heated or cooked at a temperature >40° C. With the application of the heat, the raw plant ingredient is modified in a manner and gains a paste property. Other ingredients of the composition may be modified in a manner as well.

It should be noted that the term "meat based material" as used in the present invention is defined as the material comprising at least 33.3% (i.e. at least ⅓) "meat" ingredient by weight on an "as formulated" basis and less than 50% (i.e. 0.1%-49.9%) plant ingredient by weight on an "as formulated" basis. It should also be noted that the weight percentages of the meat and plant ingredient in the "meat based material" are determined as they are added in the formula (formulation/recipe) of the meat based material, including inherent water contents of the meat and plant ingredients, not counting the water added for processing. Or in other words, weight percentages of the meat and plant ingredient in the "meat based material" are determined on an "as formulated" basis. Preferably the "meat based material" comprises 33.3%-75% "meat" ingredient by weight on an "as formulated" basis and 15%-50% plant ingredient by weight on an "as formulated" basis. 33.3% to 75% "meat" ingredient providing cost economical advantage versus the "meat based material" with over 75% meat ingredient. Our tests show that, when the meat based material has 15%-50% plant ingredient on an "as formulated" basis, a sheet made of the meat based material can achieve an optimized durability and strength and a balanced palatability.

Now to define the phrase of "on an as formulated basis" in present invention the previous paragraph mentions. It is about a means to determine weight percentages of the meat and plant ingredient in the meat based material and other ingredients as well. "On an as formulated basis" is also the method that currently FDA (or AAFCO) organizations of USA usually utilize to determine weight percentage for an ingredient in a product or product member. By the means of "on an as formulated basis", the weight percentage of an ingredient in a food or food member is determined as it is added in the formulation of the food or food member, including its inherent water content, not counting the water added for processing. In order to help understand how the weight percentages of meat and plant ingredient in the "meat based material" are determined in present invention, here introduces an embodiment to form the formula of the "meat based material" as follows.

As an embodiment to form the "meat based material", the formula to form the meat based material includes the following raw materials: Frozen chicken breast (inherent moisture content 75%) or fresh chicken breast (inherent moisture content 75%), Corn starch (inherent moisture content 14%) and Sorbitol (inherent moisture content 1%) and water (water is added for processing, thus not counted). In this formula embodiment, the weights of the raw materials of frozen chicken breast (inherent moisture content 75%), Corn starch (inherent moisture content 14%) and Sorbitol (inherent moisture content 1%) respectively are: 100 kg, 65 kg, 35 kg. Total weight is 100+65+35=200 kg. In this formula, frozen chicken breast is the "meat" ingredient to form "the meat based material". Meat percentage in this formula mathematically is 100/(100+65+35)=50%. The following process, as an embodiment of manufacturing process utilizing the "meat based material" under this formula above mentioned to form an edible pet chew, can further help understand the means to determine ingredient content percentage "on an as formulated basis":

Step (i). Prepare Frozen chicken breast (inherent moisture content 75%), Corn starch (inherent moisture content 14%) and Sorbitol (inherent moisture content 1%). Weights of them are respectively: 100 kg, 65 kg, 35 kg.

Step (ii). Defrost the frozen chicken breast. Form a "meat based material" composition by mixing the defrosted chicken breast from step (i) with corn starch and sorbitol together.

As an alternative process embodiment of this step (ii): the Frozen chicken breast (moisture 75%) is defrosted and dried to dried chicken breast (moisture of the dried chicken breast is 8%); then dried chicken breast (moisture 8%) is ground to chicken breast meal (moisture 8%); form a "meat based material" composition by mixing the chicken breast meal (moisture 8%) with corn starch and sorbitol from the step (i) and water together (water is added for processing). Remark: the processes of defrosting and/or drying to dried chicken breast and/or grounding to chicken breast meal above mentioned can be done by the edible pet chew product manufacturer itself or alternatively by a raw material supplier (for example frozen chicken breast supplier) for the finished product manufacturer.

As another alternative process embodiment of this step (ii): separate the Frozen chicken breast into two parts, part#1 and part#2; part#1 of the Frozen chicken breast (moisture 75%) is defrosted and dried to dried chicken breast (moisture 8%); then dried chicken breast (moisture 8%) is ground to chicken breast meal (moisture 8%); part#2 of the Frozen chicken breast (moisture 75%) is defrosted only; form a "meat based material" composition by mixing the chicken breast meal (moisture 8%) and defrosted chicken breast (moisture 75%) with corn starch and sorbitol from the step (i) together. Remark: the process of defrosting, drying to dried chicken breast and/or grounding to chicken breast meal above mentioned can be done by the finished product manufacturer itself or by a raw material supplier alternatively for the finished product manufacturer.

Step (iii). Form the "meat based material" composition to an initially long chewy sheet or a three-dimensional-shape chewy member by a forming process for example rolling, or extruding, or pressing, or molding, or injection molding.

Step (iv). Cut the long sheet to a number of smaller sheets with pre-determined smaller size(s).

Step (v). Form the smaller sized sheet member or the three-dimensional-shape chewy member (alternatively with another edible material member) typically by manipulating to a structure or form of a finished dog chew product.

Step (vi). Dry and harden the product by heating it and obtain a final finished dog chew product. Moisture content of the meat based material member in final finished products is 14%. Moisture content of the final finished product is typically 14%.

In this embodiment to formulate the "meat based material" and to process the products, frozen chicken breast or fresh chicken breast (inherent moisture content 75%), Corn starch (inherent moisture content 14%) and Sorbitol (inherent moisture content 1%) are applied. "Meat" percentage by weight in this formula mathematically is 100 kg/(100 kg+65 kg+35 kg)=50% "on an as formulated basis" (frozen chicken breast is the "meat" ingredient in this formula). "Plant" percentage by weight in this formula mathematically is 65 kg/(100 kg+65 kg+35 kg)=32.5% "on an as formulated basis" (corn starch is the "plant" ingredient in this formula).

Compared to "on an as formulated basis" method to determine ingredient content percentage, the method to determine the ingredient content percentage on a basis of FINISHED product is very different, especially when ingredients with different inherent moisture contents appear in the formula. The latter is based on finished product, where some ingredients (for example frozen chicken in this case) lose a part of their inherent water content after processing. Water/moisture content change for an ingredient before and after processing is the key factor that leads to a weight percentage change for the ingredient in a product member or in a product. An ingredient with high inherent moisture content (for example frozen chicken in this case) may have a reduced weight percentage value on a basis of FINISHED product than the one "on an as formulated basis". Now getting back to the formula to form a meat based material above paragraph mentioned. In that case, moisture content of "meat" changes from 75% inherently to finally 14% (14% equal to moisture content of the finished product). For "plant", from inherently 14% to finally 14%, no changes. For sorbitol, from inherently 1% to finally 14%. On a basis of finished product, "meat" percentage in the meat based material by weight mathematically is 29.07 kg/(29.07 kg+65 kg+40.29 kg)=21.6% (chicken breast is the "meat" ingredient with a weight changing from initially 100 kg to finally 29.07 kg after processing). "Plant" percentage in the meat based material by weight mathematically is 65 kg/(29.07 kg+65 kg+40.29 kg)=48% (corn starch is the "plant" ingredient with a weight changing from initially 65 kg to 65 kg after processing without weight reduction). "Sorbitol" percentage in the meat based material by weight mathematically is 40.29 kg/(29.07 kg+65 kg+40.29 kg)=29.9% (sorbitol is an additive ingredient with a weight changing from initially 35 kg to 40.29 kg after processing by gaining water from processing).

Preferably in present invention, regarding the weight percentage value on a basis of FINISHED product, the plant ingredient in the "meat based material" member is <50%. Our tests indicate that, in FINISHED product, <50% plant ingredient by weight in the meat based material member can achieve a good malleability and durability for the meat based material member. Too much plant ingredients in the meat based material member will reduce the palatability or attraction of the member significantly. Our tests indicate that, in FINISHED product, when plant ingredient being >50% by weight in the meat based material member, plant ingredient will be the absolutely primary ingredient in the meat based material member, which makes the meat based material member NOT good in palatability performance and not attractive to dogs. Therefore, in FINISHED product, ">50% plant ingredient in the meat based material member" isn't a preferred option to form the "meat based material" member of the edible pet chew of the present invention.

It should be noted that the term "meat based material sheet" as used in the present invention is defined as a sheet formed from the meat based material. (FIG. 1 is an example of the meat based material sheet). Typical thickness range of the sheet is 0.1 mm to 5 mm, more typically 0.5 mm to 2.5 mm. A typical "sheet" structure or shape is anything thin, with roughly homogeneous thickness at every area of it.

It should be noted that the term "meat based material three-dimensional-shape chewy member" as used in the present invention is defined as a chewy three-dimensional-shape member formed from the meat based material to form an edible pet chew. The "three-dimensional-shape" is defined as a structure or a shape that isn't flat and doesn't resemble a sheet.

It should be noted that the term of "plant based material" as used in the present invention is defined as a material composition comprising over 50% plant ingredient in the formula.

Preferably, in addition to meat and plant ingredient, the "meat based material" composition further includes an additive. The additive is introduced to provide the meat based material chewy sheet sufficient rigidity and strength in finished product after the chewy sheet is treated by a drying process. The additive is selected from the group consisting of a thickener, a humectant, a stabilizer, an emulsifier, a gelatinizer, a binder and a filler.

The thickener is selected from the group consisting of: glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides (DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glycerides of fatty acids, modified soybean phospholipid, sodium caseinate, citric and fatty acid esters of glycerol, lactic and fatty acid esters of glycerol, sodium starch octenyl succinate and acetylated mono and diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In one preferred embodiment to form the composition of the "meat based material", the ingredient of "at least 33.3% meat ingredient" in the composition is merely traditional meat by-product ingredient, exclusive of traditional meat ingredient. The advantages of traditional meat by-product ingredient are: (i), lower material cost versus traditional meat ingredient; (ii), stronger scent that may attract dogs more than traditional meat ingredient.

In an embodiment to form the composition of the "meat based material", in addition to meat and plant ingredient, rawhide material or animal hide material is used. A small percentage of rawhide (for example <20%) may help strengthen the malleability and durability of the "meat based material" sheet. But due to the disadvantages of rawhide material as mentioned in above Paragraphs, rawhide material to be used to form the composition is required to be at a small percentage by weight. Our tests indicate that when rawhide percentage in the composition goes higher than 20%, the finished chewy sheet made from the composition presents its sheet surface with significant roughness or bumps or ridges or irregularities, which isn't visually attractive for dog chew consumers. The tests also indicate that when rawhide percentage in the composition goes higher than 30%, the finished chewy sheet made from the composition presents its sheet surface with too much roughness or bumps or ridges or irregularities. And the chewy sheet with significant roughness on surface looks very different from traditional animal hide sheet, making it fail to simulate the visual property of traditional animal hide sheet. Therefore, the rawhide material or animal hide material percentage in the composition of this embodiment is required to be fairly low, as much as 0.1%-30%, typically 5%-20%. Alternatively, the rawhide material or animal hide material percentage in the composition is 0.1-5% to reduce rawhide material disadvantages as mentioned above.

In another embodiment to form the composition of the "meat based material", rawhide material or animal hide material is free in the composition. The composition of the "meat based material" free of rawhide material can be formed to a chewy sheet that completely keeps away from the numerous disadvantages as mentioned in above Paragraphs that rawhide materials may render.

In one embodiment to form the composition of the "meat based material", bone material is free in the composition. The composition of the "meat based material" free of bone material or bone powder can be formed to a chewy sheet that completely keeps away from the numerous disadvantages as mentioned below that bone material may render. Firstly, one skilled in this art knows bone powder doesn't have inherent adhesiveness and malleability. Therefore it does not help the durability for a dog chew member. Even worse, it may harm the durability of the member. For example, "5-15% bone powder material" in a member, for example a layer member, is viewed as too high percentage that may cause a harmed durability of the layer member. The second disadvantage, a content of bone powder material, for example 5-15% bone powder material in the member is viewed as too high percentage in the formula that may lead to dog constipation and cause health risk for dogs. The third disadvantage is that, a layer member with some content of bone powder may fail to simulate the strength and durability property as a regular rawhide sheet has.

In yet another embodiment to form the composition of the "meat based material", in addition to meat and plant ingredient, bone material is used. But due to the disadvantages of bone materials as mentioned in above paragraph, bone material to be used to form the composition is preferred to be at a small percentage by weight. Our tests indicate that when bone material percentage in the composition goes higher than 5%, the finished chewy sheet made from the composition presents a considerable reduction in malleability or durability. Chewy sheet with a considerable reduction in malleability or durability isn't thought to be a good one to form an edible pet chew. Therefore, the bone material percentage in the composition of this embodiment is preferred to be fairly low, as much as 0.1%-4.9%.

In yet another embodiment to form the composition of the "meat based material", in addition to meat and plant ingredient, animal horns, animal hooves, or animal esophagus, or animal throat is used.

As an alternative formula for an embodiment to form the "meat based material" composition, the "meat based material" composition is consisting of fresh chicken breast (inherent moisture content 75%), corn starch (inherent moisture content 14%), glycerin (inherent moisture content 0%) and water (water is added for processing purpose, thus not counted for ingredient percentage concern). Fresh chicken/meat and frozen chicken/meat is the material derived from slaughtered animals with inherent moisture content over 50% (typically 65%-85%) by weight. Specifically in this formula case, fresh chicken inherent moisture is 75%. Ingredient percentages of every ingredient on an "as formulated" basis are as follows: Fresh chicken breast (50%), Corn Starch (32.5%), Glycerin (17.5%). In this formula, fresh chicken breast (inherent moisture content 75%) is the sole meat ingredient accounting to lager than 33.3% of the whole formula on an "as formulated" basis, 50% actually. Total weight of "plant" ingredient (corn starch in this case) is lower than 50% in the formula, actually 32.5%. In FINISHED product (with moisture content 14%), total weight of "plant" ingredient (corn starch in this case) in the meat based material member is lower than 50% in the formula, actually 48.23% (=65/(29.07+65+40.7)*100%). This formula is free of animal hide material and bone material. As a preferred embodiment of manufacturing process for this formulated meat based material: 1. the raw material of the fresh chicken breast (inherent moisture content 75%) is pretreated by drying with heating to chicken jerky (moisture 8%) and then chicken jerky is pretreated by grinding to chicken meal (moisture content 8%) (remarks: this pretreatment step can be done either by the edible pet chew manufacturer or by chicken breast raw material supplier for the edible pet chew manufacturer); 2. Mix chicken meal, corn starch, water and glycerin together and make a meat based material composition; 3. Extrude the composition with an extruder to pre-determined shape, for example a sheet shape; 4. Form an edible pet chew with the meat based material member alternatively with another member; 5. Dry and harden the edible pet chew by heating to a finished moisture content of 14%.

As another alternative formula for an embodiment to form the "meat based material" composition, the "meat based material" composition consisting of Frozen chicken (inherent moisture content 80%), Fresh pork (inherent moisture content 77%), Tapioca, Soybean protein, Sorbitol and Xanthan gum. Ingredient percentages of every ingredient on an "as formulated" basis are as follows: Frozen chicken (40%), Fresh pork (5%), Tapioca (30%), Soybean protein (8%), Sorbitol (12%) and Xanthan gum (5%). In this formula, total weight of "meat" ingredient (frozen chicken and fresh pork in this case) is larger than 33.3% in the formula, actually 45%. Total weight of "plant" ingredient (tapioca and soybean protein in this case) is lower than 50% in the formula, actually 38%. Sorbitol and Xanthan gum are used as additives. This formula is free of animal hide material and bone material. As a preferred embodiment of manufacturing process for this formulated meat based material: 1. the raw material of the frozen chicken (inherent moisture content 80%) is defrosted and ground to ground chicken with moisture 80% and then moisture of ground chicken is partially removed from inherently 80% to a lower value for example 40%; 2. Fresh pork (inherent moisture content 77%) is ground to ground pork with moisture 77% and then moisture of ground pork is partially removed from inherently 77% to a lower value for example 40%; 3. Mix ground chicken, ground pork, tapioca, soybean protein, Sorbitol and xanthan gum together and make a meat based material composition; 4. Extrude the composition with an extruder to pre-determined shape, for example sheet shape; 5. Form an edible pet chew with the meat based material member; 6. Dry and harden the edible pet chew by heating to a finished moisture content of 16%.

As another alternative formula for an embodiment to form the "meat based material" composition, the "meat based material" composition consisting of Fresh duck meat (inherent moisture 72%), Fresh cattle liver (inherent moisture 72%), Ground rawhide, Sweet potato, Potato starch, Fructose, Gelatin, Bone powder and Water (water not counted for ingredient percentage concern). Ingredient percentages of every ingredient on an "as formulated" basis are as follows: Fresh duck meat (50%), Fresh cattle liver (10%), Ground rawhide (6%), Sweet potato (17%), Potato starch (10%), Fructose (3%), Gelatin (2%), Bone powder (2%) and Water (water not counted for ingredient percentage concern). In this formula, total weight of "meat" ingredient (fresh duck and fresh cattle liver in this case) is larger than 33.3% in the formula, actually 60%. Total weight of "plant" ingredient (sweet potato and potato starch in this case) is lower than 50% in the formula, actually 27%. Fructose and gelatin are used as additives. This formula contains animal hide material and bone material, wherein animal hide material is <30% and bone material is <5%. As a preferred embodiment of manufacturing process for this formulated meat based material, the raw material of meat ingredient (fresh duck and fresh cattle liver with inherent moisture 72%) is pre-treated by drying and then grinding either by the edible pet chew manufacturer or by fresh duck/cattle liver supplier for the edible pet chew manufacturer. The drying and grinding process makes dried duck meal and dried cattle liver meal. After dried duck meal and dried cattle liver meal is ready, they are mixed with plant ingredients mentioned above and other ingredients together to make meat based material composition. Meat based material composition is then being extruded in an extruder being processed to a meat based material member for an edible pet chew.

Here comes an aspect of present invention. In this aspect, the edible pet chew includes a chewy sheet of "meat based material". Preferably the weight of the chewy sheet accounts for at least 20% (more typically at least 50%) of the total weight of the edible pet chew product in the circumstance that the edible pet chew has additional member(s) besides the meat based material chewy sheet. The "meat based material" includes at least 33.3% meat ingredient by weight on an "as formulated" basis, and less than 50% (more typically 15%-50%) plant ingredient by weight. The sheet form is preferably obtained by extruding the "meat based material" composition with an extruder. Furthermore, preferably the "meat based material" composition is treated by heating to at least 40° C. before its being extruded at the extruder die to a sheet form, typically during the extruding process within the extruder.

In this aspect, "at least 33.3% meat ingredient" in the chewy sheet provides the edible pet chew chewy sheet member an inherent attraction for dogs with the inherent smell and taste of meat ingredient. Further, "<50% (more typically 15%-50%) plant ingredient" in the chewy sheet help the malleability and durability of the edible pet chews chewy sheet member and provides additional plant nutrition to the finished products, for example plant protein. With the above elements of the member of "meat based material chewy sheet", the edible pet chew of this aspect can well achieve a good palatability and durability.

As an embodiment of this aspect, the meat based material chewy sheet is a single chewy sheet. Alternatively, the edible pet chew has other member(s) besides the single chewy sheet. Compared to multiple sheet constitution, the advantages of an edible pet chew with single sheet include: save manufacturing cost for labors (in comparison, multiple sheet require additional labor to manipulate a second or third sheet in), save manufacturing material cost (in comparison, multiple sheet requires additional material to create them).

In another embodiment of present invention within this aspect, an edible pet chew consisting of a single chewy sheet of "meat based material", wherein the "meat based material" includes at least 33.3% meat ingredient by weight on an "as formulated" basis, and less than 50% (more typically 15%-50%) plant ingredient by weight, wherein the sheet form is preferably obtained by extruding the "meat based material" composition with an extruder. Furthermore, the "meat based material" composition is preferably treated by heating to at least 40° C. before its being extruded at the extruder die.

Now refer to FIG. 1. Member 0100 is an embodiment of the "meat based material" chewy sheet, wherein the "meat based material" chew sheet is an essential member of an edible pet chew. The term of "chewy" in this invention is defined as a material that is long-lasting for chewing or can be chewed by a dog for a long time before being ingested by the pet. The member 0100 is in a flat sheet form simulating the form or shape of a traditional rawhide sheet. It should be recognized that the length, width, and thickness of the Chewy Sheet 0100 may vary as predetermined to make a pet chew with different sizes, shapes and configurations. The size or area of the Chewy Sheet 0100 of FIG. 1 may be various according to predetermined request. The Sheet 0100 is divided or cut into small pieces in shape of rectangle or other specific shapes for further forming the pet chew products. The thickness of the sheet 0100 may be various as well according to predetermined request, resembling actual known rawhide sheet. The typical thickness of the chewy sheet ranges from 0.1 mm to 5 mm (more typically 0.5 mm to 2.5 mm). The typical final moisture content of the chewy sheet member in finished products ranges from 8% to 18% (more typically 12% to 16%). Tensile strength is one kind of specification that describes "chewy" quality of a material. The typical tensile strength of the chewy sheet is at least 0.5 mPa, more typically 0.5 mPa to 5 mPa.

The preferred embodiments of the present invention as shown in FIG. 3 through FIG. 6 are developed within the aspect of the present invention.

0101 in FIG. 1 represents the surface of "meat based material" chewy sheet 0100. 0102 in FIG. 1 represents the both longitudinal and latitudinal sides of chewy sheet 0100.

Figure 2:
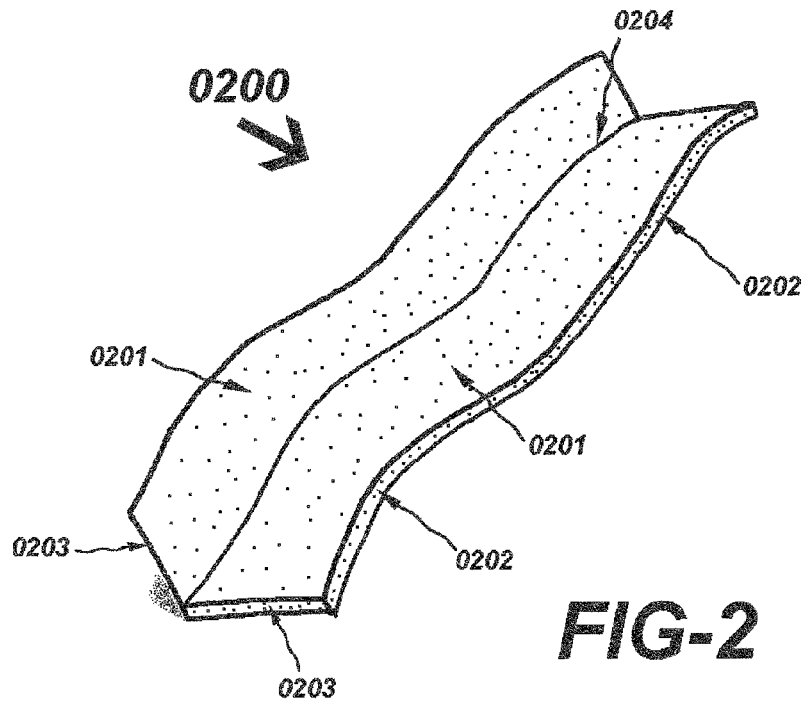
FIG. 2 is a top plan view of a smaller "meat based material" chewy sheet cut from the large chewy sheet of FIG. 1. The smaller chewy sheet is folded in the pattern as shown in FIG. 2 as a further preparation to form an embodiment of an edible pet chew of the present invention.

As shown in FIG. 2. A smaller Chewy sheet 0200 is created by cutting Sheet 0100 into smaller pieces. Fold Sheet 0200 two times longitudinally making a folded sheet with approximately ⅓ width of the original sheet. In FIG. 2, 0201 represents the surface of the small sheet 0200 cut from 0100. 0202 and 0203 are respectively longitudinal and latitudinal sides of the small sheet 0200.

Figure 3:
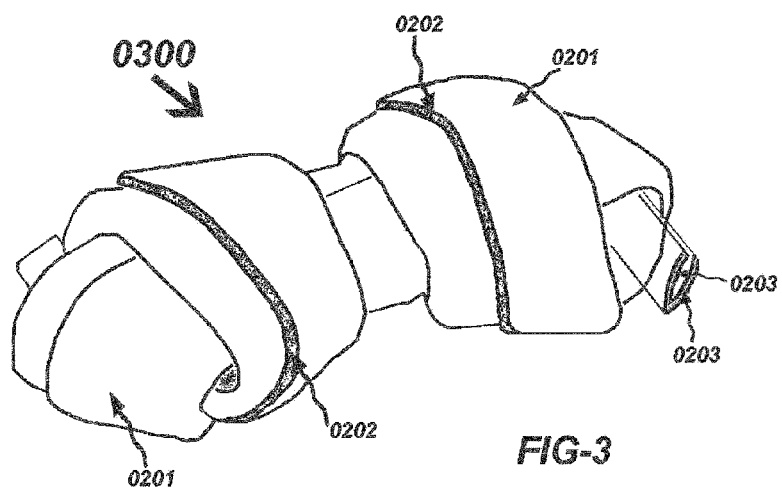
FIG. 3 is an elevational view of an embodiment of a pet chew formed from the folded chewy sheet of FIG. 2 to have two knotted ends looking like the two epiphyses of a real bone with a diaphysis in the middle.

As shown in FIG. 3, an embodiment of present invention. An alternate shaped Pet Chew 0300 is formed simulating a bone shape. Processes include, get the folded Sheet 0200 of FIG. 2 ready. Tie the two longitudinal ends of the folded sheet 0200 to make a simulation of two epiphyses of a real bone with a diaphysis in the middle.

Figure 4:
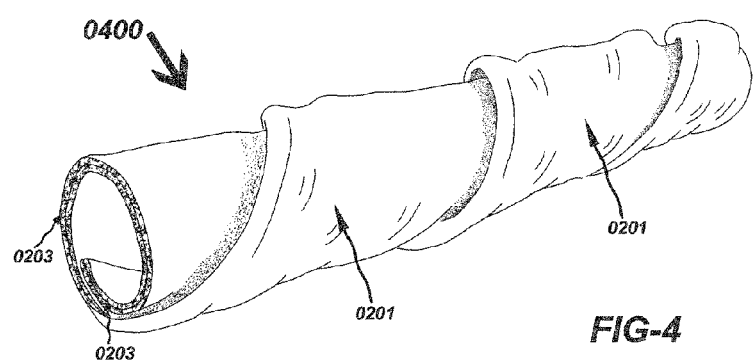
FIG. 4 is an elevational view of another embodiment of a pet chew formed from a predetermined-sized chewy sheet cut from the large chewy sheet of FIG. 1, in a retriever roll shape.

As shown in FIG. 4, an embodiment of present invention. An alternate shaped Pet Chew 0400 is formed looking like a twisted stick. Processes include, get the folded Sheet 0200 of FIG. 2 ready. Shape it by hand by twisting the sheet.

Figure 5:
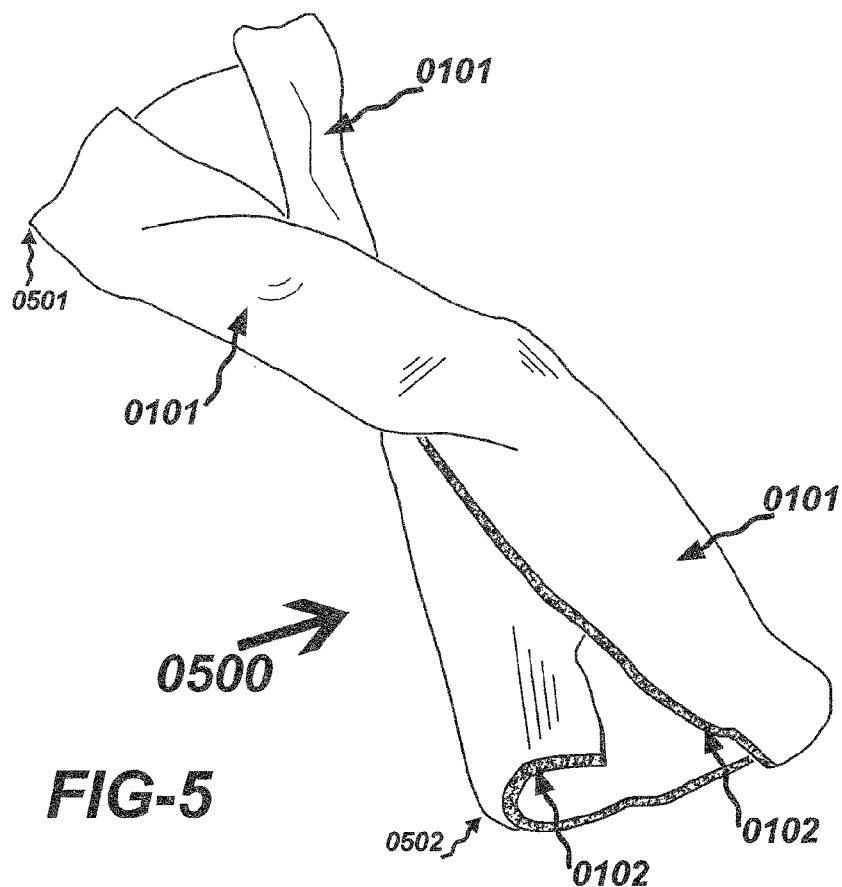
FIG. 5 is an elevational view of another embodiment of a pet chew formed from a predetermined-sized chewy sheet cut from the large chewy sheet of FIG. 1, resembling a bow tie.

As shown in FIG. 5, an embodiment of present invention. An alternate shaped Pet Chew 0500 is formed looking like a bow tie. Processes include, cut a small properly-sized rectangular sheet from Sheet 0100 of FIG. 1. Fold the small sheet longitudinally at the position of 0501 and 0502. Twist the folded sheet having it look like a bow tie.

Figure 6:
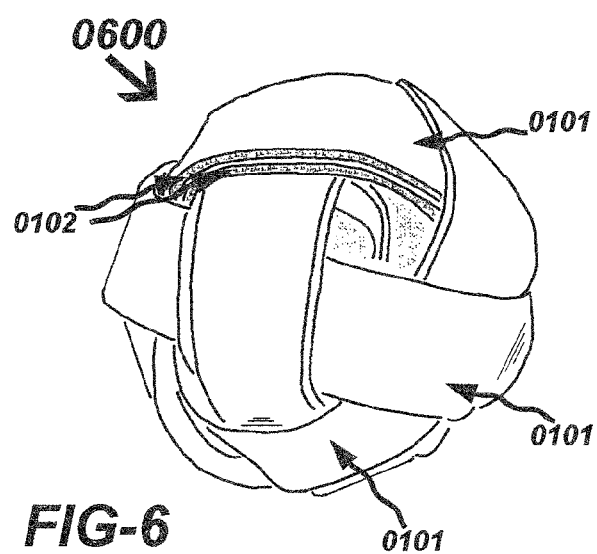
FIG. 6 is an elevational view of another embodiment of a pet chew assembled with a few pieces of predetermined-sized chewy sheets cut from the large chewy sheet of FIG. 1, resembling a ball shape.

As shown in FIG. 6, an embodiment of present invention. An alternate shaped Pet Chew 0600 is formed looking like a ball shape. Processes include, cut a number of small properly-sized rectangular sheets from Sheet 0100 of FIG. 1. Assemble the sheets to have it structured to a ball shell with hollow core inside.

Here comes another aspect of present invention. In this aspect, the edible pet chew includes a first member of "meat based material" sheet and a second member of edible material wrapped in or positioned in the first member. It should be noted that the verb of "wrap" as used in present invention typically means "to wind or fold material A around material B in a relationship that B is covered by A completely without exposure or in a relationship that B is partially covered by A with a portion of B is exposed". The "meat based material" includes at least 33.3% meat ingredient by weight on an "as formulated" basis, and less than 50% (more typically 15%-50%) plant ingredient by weight. The sheet form of the "meat based material" is preferably obtained by extruding a "meat based material" composition with an extruder. Furthermore, preferably the "meat based material" composition is treated by heating to at least 40° C. before its being extruded at the extruder die to a sheet form, typically during the extruding process within the extruder. Preferably, the outer layer of the edible pet chew is formed primarily by the first member, wherein over 50% by area of the outer layer of the edible pet chew is the first member. Alternatively, the outer layer of the edible pet chew is the first member.

In this aspect, preferably a first member of "meat based material" chewy sheet servers as an outer layer member of the edible pet chew primarily. A second member of edible material is introduced herein, being wrapped by the "meat based material" chewy sheet. The second member of "edible material" may provide at least one of the four advantages as described as follows. (i), Improve the palatability of the edible pet chew. The outer layers have plant ingredient in the formula, which is assumed not perfectly attractive. The second member of "edible material member" wrapped in may provide additional attraction to dogs, thus enhancing the palatability of the edible pet chew product. (ii), Provide additional nutrition for dogs. (iii), Create visual attractions for consumers. Generally, the second member of "edible material" will have a different coloring or looking from that of the first member, thus generating layering effect of the edible pet chew attractive to consumers. (iv), In the circumstance that the edible material member is formulated more palatable than the outer meat based material member, the presence of the edible material member can additionally encourage dogs to chew and the dogs will eat starting with the outer layer member before their reaching the inner edible material member. Dogs will be more attracted by the edible material member wrapped therein but they can't reach it unless they ingest the "meat based material" outer layer. In this pattern, the pet chew achieves consistent attraction to dogs during their chewing time. (iv), material with lower cost versus the meat based material, thus lowering the whole product cost level.

Preferably in this aspect, the second member of "edible material" is wrapped in by the "meat based material" chewy sheet, wherein at least a portion of the "edible material member" is covered by the "meat based material chewy sheet member" without exposure. The edible material member wrapped in by the "meat based material" chewy sheet can be completely covered by the outer layer without any exposure or be partially covered with a portion exposed. Alternatively, the proportion of "meat based material" chewy sheet member to "edible material" member wrapped therein by weight is in the range between 1:20 and 20:1.

Preferably in this aspect, the first member of "meat based material" chewy sheet forms the primary structure of the edible pet chew and the outer layer of the edible pet chew is primarily formed by the "meat based material" member. Alternatively, the proportion of "meat based material" chewy sheet outer layer member to "edible material" member wrapped therein by weight is in the range between 1:5 and 20:1.

Preferably in this aspect, the member of edible material wrapped in the "meat based material" outer layer is a material selected from the group consisting of: a plant based material, a traditional animal hide sheet or a traditional rawhide sheet, an animal hide based material, a "plant and meat based" material comprising 20%-50% plant ingredient and 5%-33% meat ingredient by weight, a jerky, a "plant and animal hide based" material comprising 25%-50% plant ingredient and at least 25% animal hide ingredient, and a "meat based material".

Preferably in this aspect, the member of edible material wrapped in the "meat based material" outer layer is an edible material sheet. Preferably the edible material sheet is a chewy sheet. The typical thickness of the edible material sheet ranges from 0.1 mm to 5 mm.

In an embodiment of present invention within this aspect, the edible pet chew is initially formed from a co-extruded multiple layer structured material. Layer A of the co-extruded multiple layer structured material is a "meat based material" sheet and layer B is "edible material" sheet, wherein the layer A and B are treated by a co-extrusion process together to form the multiple layer structured material (typically layer A and B adhere to each other firmly and hard to separate after the con-extrusion process). In finished edible pet chew product, the second member of "edible material" sheet is wrapped or positioned in the first member of "meat based material" sheet. Preferably, besides the multiple layer structured material, the edible pet chew has another "edible material" member (typically a sheet member) that provides additional attraction or nutrition to the product. Alternatively the multiple layer structured material is wrapped in or positioned in the "edible material" member, wherein at least a portion of the multiple layer structured material is covered by the "edible material" member. Or alternatively the "edible material" member is wrapped in or positioned in the multiple layer structured material, wherein at least a portion of the "edible material" member is covered by the multiple layer structured member. A preferred process for this embodiment briefly is as follows: Prepare a "meat based material" composition and an "edible material" composition. Deliver the compositions into a co-extrusion extruder. After the co-extrusion process, a two layer structured material is obtained. Manipulate the multiple layer structured material to a finished product form, having the "edible material" sheet be wrapped in or positioned in the "meat based material" sheet. Dry and harden the product to moisture content 8%-18%.

In an embodiment of present invention within this aspect, the edible pet chew includes an outer layer of "meat based material" chewy sheet and a "plant and meat based material" sheet wrapped therein. Preferably the "plant and meat based material" sheet is an extruded chewy sheet. The "plant and meat based material" chewy sheet wrapped therein has 20%-50% plant ingredient and 5%-33% meat ingredient by weight. In this embodiment, the member of "plant and meat based material" chewy sheet has 5%-33% meat, which is comparatively more cost economical than the material having over 33.3% meat.

In another embodiment of present invention within this aspect, the edible pet chew includes an outer layer of "meat based material" chewy sheet and a plant based material sheet wrapped therein. The plant based chewy sheet wrapped therein has over 50% plant ingredient by weight.

In another embodiment of present invention within this aspect, the edible pet chew includes an outer layer of "meat based material" chewy sheet and an animal hide sheet wrapped therein (preferably the animal hide sheet is a traditional animal hide sheet). The animal hide sheet as a very nice chewy member extends chewing time and enhances the chewing function of the edible pet chew.

In another embodiment of present invention within this aspect, the edible pet chew includes an outer layer of "meat based material" chewy sheet and another "meat based material" sheet wrapped therein.

Alternatively in this aspect, the member of edible material wrapped in the "meat based material" outer layer is a jerky. It should be noted that the term "jerky" is defined in present invention as dried meat, wherein the meat ingredient is selected from the group consisting of: animal flesh, animal muscle, animal fat, poultry meat, chicken, chicken breast, duck, goose, turkey, poultry by product, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart, animal pizzle, meat meal, chicken meal, fish meal, meat by-product meal, poultry by-product meal, meat derived ingredient, poultry derived ingredient, meat by-product derived ingredient and poultry by-product derived ingredient. A typical process to get the jerky includes: (i) separate the fresh meat from a slaughtered animal (ii) the fresh meat may be sliced into strips, or be ground to slurry, or be dried and then ground to dried meat meal form. (iii) The meat may be added with plant ingredient for example plant protein, or glycerin, or salt, or sugar before the meat being dried. Typically the meat ingredient percentage in the jerky is at least 50% by weight on a finished product basis. (iv) Dry the meat by heating. Moisture content of the dried meat is not greater than 18%.

The preferred embodiments of the present invention as shown in FIG. 11 through FIG. 20 are developed within this aspect of the present invention.

Figure 11:
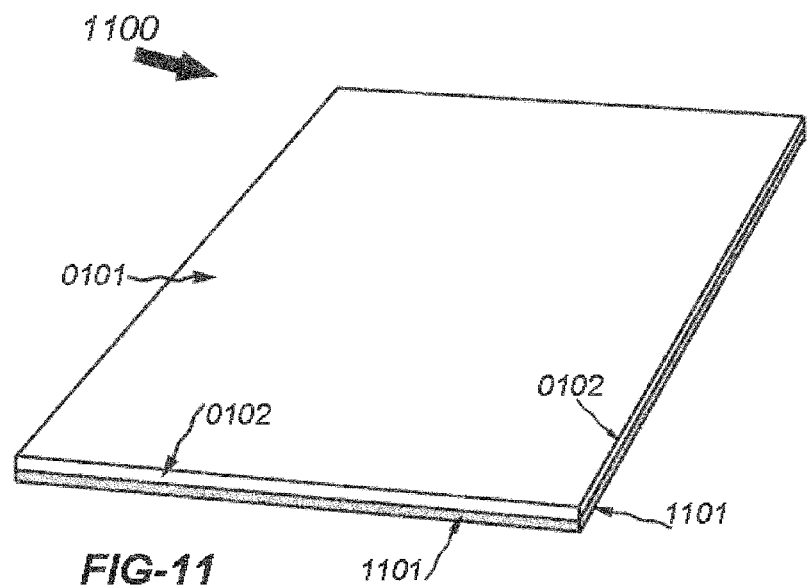
FIG. 11 is a top plan view of a co-extruded two layer structured material with a layer of "meat based material" and another layer of "edible material". This two layer structured material is prepared for further forming to embodiments of an edible pet chew.

Now refer to FIG. 11. As shown in FIG. 11. Under this aspect of present invention described in above paragraphs, a two layer structured material 1100 is prepared for forming an edible pet chew. Layer A is a "meat based material" sheet on the upper side of the two layer structured material as shown in FIG. 11. Layer A is the same material as 0100 in FIG. 1 with 0101 and 0102 as its surface and sides. Layer B is an "edible material" sheet on the lower side of the two layer structured material with 1101 as its sides.

Figure 12:
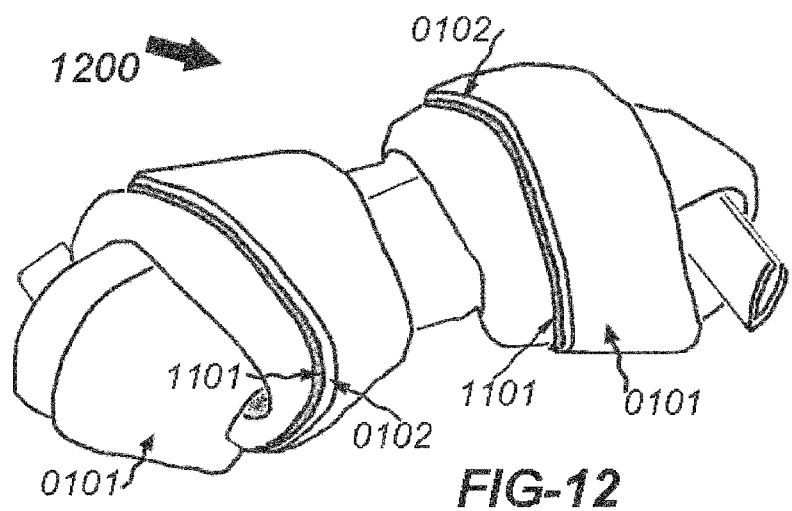
FIG. 12 is an elevational view of an embodiment of a pet chew formed from a two layer structured material with a layer of "meat based material" and another layer of "edible material".

As shown in FIG. 12, an embodiment of present invention. An alternate shaped Pet Chew 1200 is formed from material 1100 as shown in FIG. 11 with a first member of "meat based material" chewy sheet and a second member of "edible material" wrapped by the first member, simulating a bone. The "meat based material" and "edible material" are together treated by co-extrusion process to obtain a two layer structured material 1100 as shown in FIG. 11 before their being manipulated to a finished product form. In finished product, the second member of "edible material" is wrapped or positioned in the first member of "meat based material".

Figure 13:
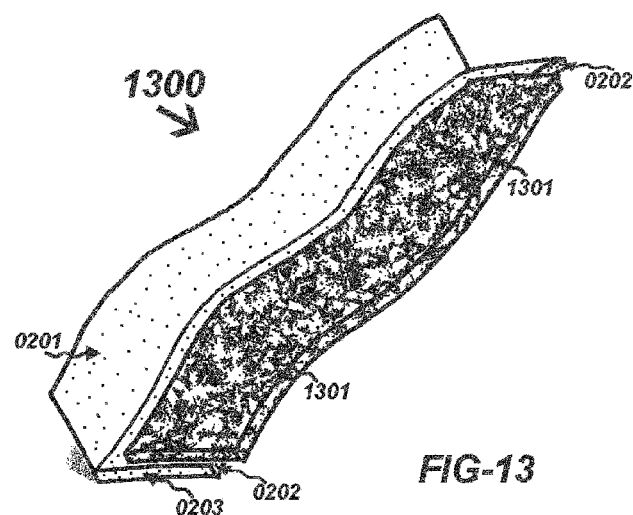
FIG. 13 is a top plan view of a single piece of "edible material" member and a chewy sheet of FIG. 2. The folded chewy sheet wrapping the "edible material" member in is a further preparation to form an embodiment of an edible pet chew of the present invention.

As shown in FIG. 13. Similar to 1100 but instead of three pieces of "edible material member", only a larger single piece of "edible material member" 1301 is positioned on the Sheet 0200. Position of the 1301 is as shown in FIG. 13. Fold Sheet 0200 two times longitudinally making a folded sheet with approximately ⅓ width of the original sheet.

Figure 14:
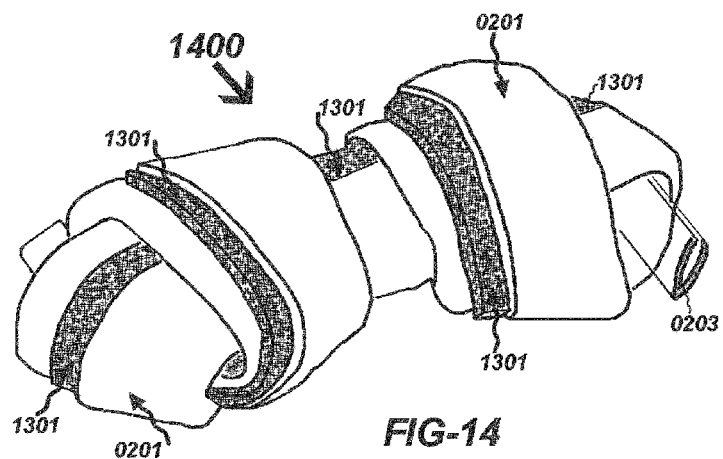
FIG. 14 is an elevational view of another embodiment of a pet chew formed from the folded chewy sheet with the "edible material" member of FIG. 13 to have two knotted ends to look like the two epiphyses of a real bone with a diaphysis in the middle.

As shown in FIG. 14, an embodiment of present invention. An alternate shaped Pet Chew 1400 is formed with a first member of chewy sheet 0200 and a second member of "edible material member" 1301, simulating a bone. Processes include, get the folded Chewy sheet 1300 with member 1301 ready. Tie the two longitudinal ends of the folded sheet 1300 to make a simulation of two epiphyses of a real bone with a diaphysis in the middle. A portion of member 1301 is covered by the outer layer of the pet chew 1400. The "edible material member" is alternatively a plant based material chewy sheet.

Figure 15:
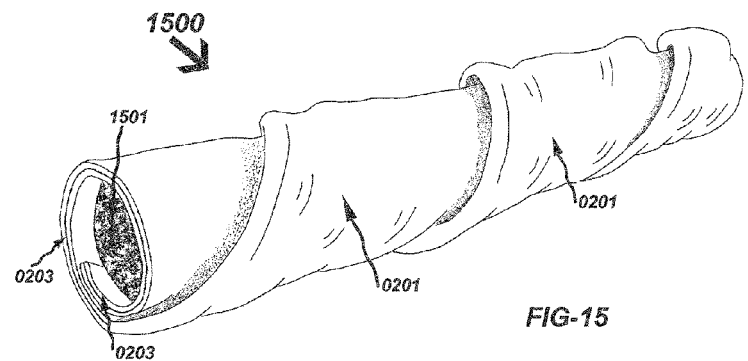

As shown in FIG. 15, an embodiment of present invention. An alternate shaped Pet Chew 1500 is formed looking like a twisted stick. Processes include, get the folded Sheet 0200 of FIG. 2 ready. Get an edible material member 1501 ready which is in a shape of cylindrical stick. Roll folded sheet 0200 longitudinally along the stick 1501 and wrap it in the sheet 0200. A twist stick product is formed with "meat based material" chewy sheet as outer layer and "edible material member" as the inner. The "edible material member" is alternatively an extruded plant based material stick.

Figure 16:
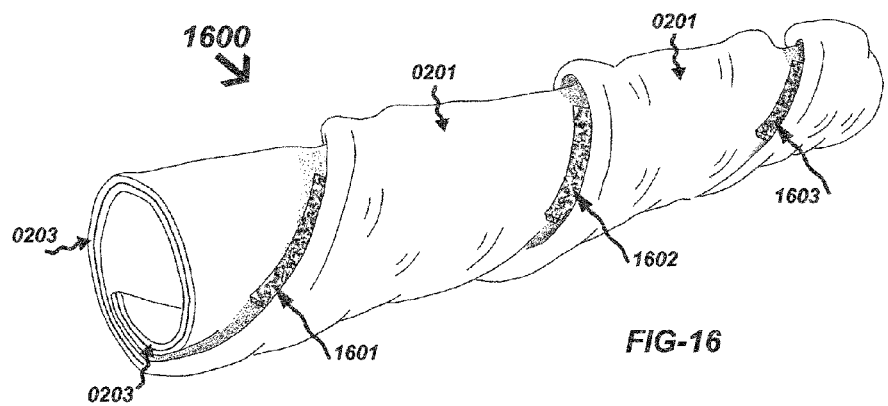

As shown in FIG. 16, an embodiment of present invention. An alternate shaped Pet Chew 1600 is formed looking like a twisted stick. Processes include, get the folded Chewy sheet 0200 ready. Get three pieces of "edible material member" 1601, 1602 and 1603 ready. Twist the folded Sheet 0200 to shape it into a tube stick form and when twisting it, wrap the three "edible material member" 1601, 1602 and 1603 in the positions as shown in FIG. 16. A small portion of every three individual "edible material member" may be exposed after being wrapped by the outer layer member as shown in FIG. 16. Alternatively, the three "edible material member" 1601, 1602 and 1603 being wrapped is chicken jerky.

As shown in FIG. 17, an embodiment of present invention. An alternate shaped Pet Chew 1700 is formed looking like a bow tie. Processes include, cut a small properly-sized rectangular sheet from Sheet 0100 of FIG. 1 and fold it longitudinally at the position of 1703 and 1704. Get two pieces of "edible material member" 1701 and 1702 ready. Put the two pieces of "edible material member" on the two longitudinal ends of the small sheet respectively. Twist the folded Sheet with the edible material members having it look like a bow tie. Alternatively, the two "edible material member" 1701 and 1702 being wrapped are rawhide sheets.

As shown in FIG. 18, an embodiment of present invention. An alternate shaped Pet Chew 1800 is formed looking like a ball shape. Processes include, cut several small properly-sized rectangular chewy sheets from Sheet 0100 of FIG. 1. Get four pieces of "edible material member" ready (member 1801 and 1802 visible in this figure are two of the four members). Assemble the small "meat based material" chewy sheets from 0100 and the four pieces of "edible material members" together to have it structured to a ball shell with hollow core inside. Position of 1801 and 1802 is as shown in FIG. 18. Alternatively, the four "edible material member" 1801 and 1802 being wrapped are rawhide based sheet with over 50% rawhide ingredient in the formula.

Figure 19:
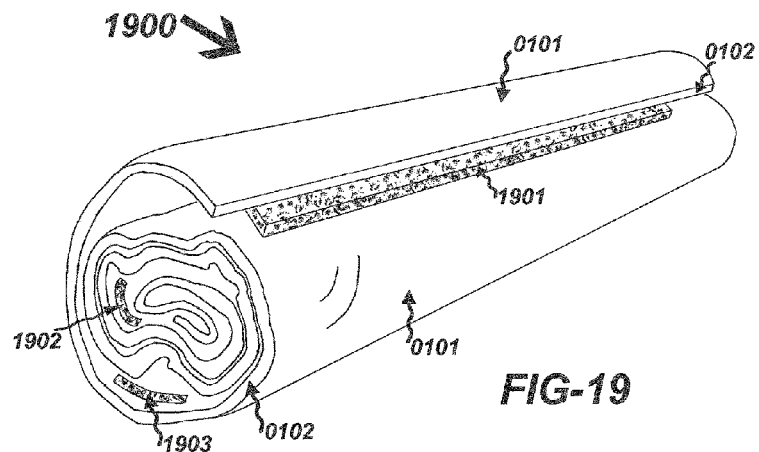

As shown in FIG. 19, an embodiment of present invention. An alternate shaped Pet Chew 1900 is formed looking like a stick. Processes include, cut a small properly-sized rectangular sheet from Sheet 0100 of FIG. 1. Get three pieces of "edible material members" in predetermined size 1901, 1902 and 1903 ready. Put the "edible material members" on the small sheet cut from sheet 0100. Roll the sheet together with the "edible material members" to make a cylindrical stick. Put the rolled stick into a CYLINDER-shaped-cavity pressing mold and then press it. The aim of pressing is to make the product in a permanent structure and longer-lasting chewing for pets. A small part of every three edible material members may be exposed as shown in FIG. 19 after being wrapped. Alternatively, the three "edible material member" 1901, 1902 and 1903 being wrapped are jerky of ground chicken liver meal.

Figure 20:
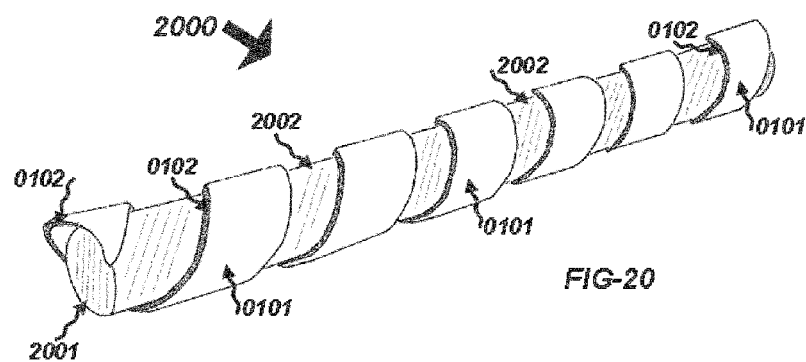

As shown in FIG. 20, an embodiment of present invention. An alternate shaped Pet Chew 2000 is formed looking like a stick. Processes include, cut a small properly-sized rectangular sheet from "meat based material" Sheet 0100 of FIG. 1. Get a cylindrical-stick-shaped "edible material member" 2002 ready. Wrap the stick 2002 longitudinally with the "meat based material" chewy sheet by twisting the chewy sheet. 2001 in this figure is an end of stick 2002. Alternatively, the stick-shaped "edible material member" 2002 being wrapped is a plant based material comprising plant starch (over 50% by weight) and chicken meal.

Here comes another aspect of present invention. In this aspect, the edible pet chew includes a first member of "edible material" and a second member of "meat based material" sheet, wherein the second member is wrapped in or positioned in the first member, wherein the first member is free of a plant based material sheet. Under the concern of palatability, the first member is required to be free of a plant based material member. The "meat based material" includes at least 33.3% meat ingredient by weight on an "as formulated" basis, and less than 50% (more typically 15%-50%) plant ingredient by weight. Preferably, the sheet form is obtained by extruding the "meat based material" composition with an extruder. Furthermore, preferably the "meat based material" composition is treated by heating to at least 40° C. before its being extruded at the extruder die to a sheet form, typically during the extruding process within the extruder. Preferably, the outer layer of the edible pet chew is formed primarily by the first member, wherein over 50% by area of the outer layer of the edible pet chew is the first member. Alternatively, the outer layer of the edible pet chew is the first member.

In this aspect, the second member of "meat based material" sheet is wrapped in by the first member of "edible material". Edible pet chew of this aspect provides the following advantages. The presence of the "meat based material" chewy sheet member serves as attractant member in the edible pet chew, which encourages dogs to chew on since dogs like the meat ingredient formulated therein. Dogs will eat starting with the first "edible material" member before their reaching the "meat based" chewy sheet member. Dogs will be well attracted by the "meat based material" sheet wrapped therein but they can't reach the "meat based" sheet unless they ingest the first "edible material" member. In this pattern, the pet chew under this aspect achieves consistent attraction to dogs during their chewing time.

In this aspect, preferably the first member of "edible material" is free of a plant based material sheet. Our tests indicate that when plant ingredient being >50% by weight in a sheet member, plant ingredient will be the primary ingredient in the sheet, which makes the sheet member inherently NOT good in palatability performance and not attractive to dogs. Therefore the first member of "edible material" in this aspect is free of a plant based material sheet, wherein the plant based material sheet has over 50% plant ingredient in the sheet by weight.

In this aspect, preferably the first member of "edible material" servers as the outer layer of the edible pet chew primarily. The "meat based material" chewy sheet member is wrapped by the "edible material" member. The introduction of the first member of "edible material" outer layer may bring at least one of the four advantages as described as follows. (i), Provide additional nutrition for dogs. (ii), Create visual attractions for consumers. Generally the first member of "edible material" will have a different coloring or looking from that of the "meat based material" member wrapped in, thus generating layering effect of the edible pet chew attractive to consumers. (iii), Extend chewing time and enhance chewing function of an edible pet chew. (iv), material with lower cost versus the meat based material, thus lowering the whole product cost level.

Preferably in this aspect, the "meat based material" chewy sheet is wrapped in the "edible material" outer layer member, wherein at least a portion of the "meat based material" chewy sheet is covered by the "edible material" outer layer member without exposure. The "meat based material" chewy sheet wrapped in by the edible material can be completely covered by the outer layer without any exposure or be partially covered with a portion exposed. Alternatively, the proportion of "edible material" outer layer member to the "meat based material" chewy sheet member wrapped therein by weight is in the range between 1:20 and 20:1.

Preferably in this aspect, the first member of "edible material" forms the primary structure of the edible pet chew and the outer layer of the edible pet chew is primarily formed by the "edible material" member. Alternatively, the proportion of the member of "edible material" outer layer to the member of "meat based material" wrapped therein by weight is in the range between 1:5 and 20:1.

Preferably in this aspect, the outer layer member of edible material wrapping the "meat based material" member is a material selected from the group consisting of: a traditional animal hide sheet or a traditional rawhide sheet, an animal hide based material, a "plant and meat based" material comprising 20%-50% plant and 5%-33% meat ingredient by weight, a "meat based material" having at least 33.3% meat ingredient by weight on an "as formulated" basis, and a "plant and animal hide based" material comprising 25%-50% plant ingredient and at least 25% animal hide ingredient.

Preferably in this aspect, the outer layer member of edible material wrapping the "meat based material" member is an edible material sheet. Preferably the edible material sheet is a chewy sheet. The typical thickness of the edible material sheet ranges from 0.1 mm to 5 mm.

In an embodiment of present invention within this aspect, the edible pet chew is initially formed from a co-extruded multiple layer structured material. Layer A of the co-extruded multiple layer structured material is an "edible material" sheet and layer B is a "meat based material" sheet, wherein the layer A and B are treated by a co-extrusion process together to form the multiple layer structured material (typically layer A and B adhere to each other firmly and hard to separate after the con-extrusion process). In finished edible pet chew product, the second member of "meat based material" sheet is wrapped or positioned in the first member of "animal material" sheet. Preferably, besides the multiple layer structured material, the edible pet chew has another "edible material" member (typically a sheet member) that provides additional attraction or nutrition to the product. Alternatively the multiple layer structured material is wrapped in or positioned in the "edible material" member, wherein at least a portion of the multiple layer structured material is covered by the "edible material" member. Or alternatively the "edible material" member is wrapped in or positioned in the multiple layer structured material, wherein at least a portion of the "edible material" member is covered by the multiple layer structured member. A preferred process for this embodiment briefly is as follows: Prepare a "meat based material" composition and an "edible material" composition. Deliver the compositions into a co-extrusion extruder. After the co-extrusion process, a two layer structured material is obtained. Manipulate the multiple layer structured material to a finished product form, having the "meat based material" sheet be wrapped in or positioned in the "edible material" sheet. Dry and harden the product to moisture content 8%-18%.

Alternatively in this aspect of present invention, the first member of the "edible material" is free of a traditional animal hide sheet, intending to reduce the disadvantages of known rawhide material as mentioned in above paragraphs.

In an embodiment of present invention within this aspect, the edible pet chew includes an outer layer member of animal hide sheet and a "meat based material" chewy sheet member wrapped therein. The animal hide sheet is selected from the group consisting of: a traditional animal hide sheet and an animal hide based sheet comprising at least 50% animal hide materials (typically rawhide materials) by weight. The animal hide sheet, especially traditional animal hide sheet, as a pretty-chewy member, significantly extends chewing time and enhances the chewing function of the edible pet chew. Animal hide sheet is recognized as a better chewy sheet with more durability for chewing than any other materialed sheets created in this pet chew market. Alternatively with this embodiment, the material of the "meat based material" chewy sheet comprises: at least 33.3% traditional meat by-product ingredient by weight on an "as formulated" basis and less than 50% (more typically 15%-50%) plant ingredient by weight.

In another embodiment of present invention within this aspect, the edible pet chew includes an outer layer of "plant and meat based material" sheet and a "meat based material" chewy sheet wrapped therein. Preferably the "plant and meat based material" sheet is an extruded chewy sheet. The "plant and meat based material" chewy sheet wrapped therein has 20%-50% plant ingredient by weight and 5%-33% meat ingredient by weight. In this embodiment, the chewy member of "plant and meat based material" has 5%-33% meat, which is comparatively more cost economical than the material having over 33.3% meat.

The preferred embodiments of the present invention as shown in FIG. 7 through FIG. 10 are developed within this aspect of the present invention.

Now refer to FIG. 7. As shown in FIG. 7. Under this aspect of present invention described in above paragraphs, a co-extruded two layer structured material 0700 is prepared for forming an edible pet chew. Layer A is an "edible material" sheet on the upper side of the two layer structured material as shown in FIG. 7 with 0701 and 0702 as its surface and sides. Layer B is a "meat based material" sheet on the lower side of the two layer structured material. Layer B is the same material as 0100 in FIG. 1 with 0101 and 0102 as its surface and sides.

As shown in FIG. 8, an embodiment of present invention. An alternate shaped Pet Chew 0800 is formed from material 0700 as shown in FIG. 7 with a first member of "edible material" sheet and a second member of "meat based material" sheet wrapped by the first member, simulating a bone. The "meat based material" and "edible material" are together treated by co-extrusion process to obtain a two layer structured material 0700 as shown in FIG. 7 before their being manipulated to a finished product form. In finished product, the second member of "meat based material" is wrapped or positioned in the first member of "edible material".

Figure 9:
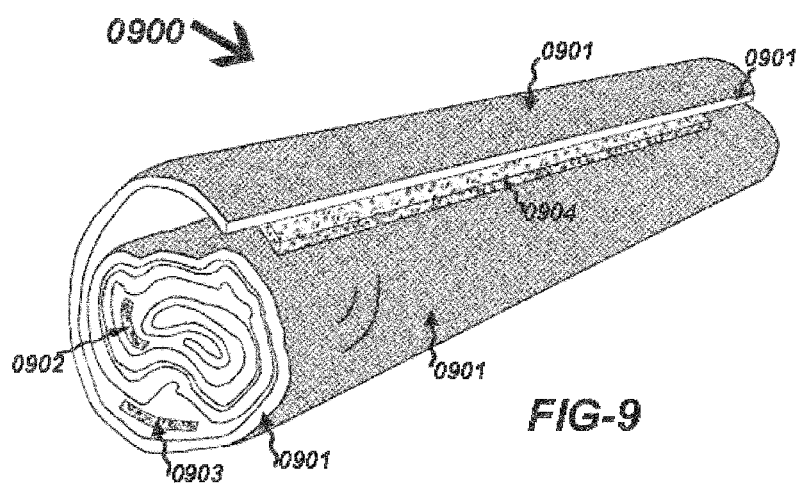
FIG. 9 is an elevational view of another embodiment of a pet chew formed from a member of outer layer of "edible material" and another member of "meat based material" chewy sheet cut from the large chewy sheet of FIG. 1, looking like a cylindrical stick.

As shown in FIG. 9, an embodiment of present invention. An alternate shaped Pet Chew 0900 is formed looking like a stick. Processes include, cut three pieces of small properly-sized rectangular sheet from Sheet 0100 of FIG. 1. Get the three pieces of "meat based material chewy sheet member" in predetermined size 0902, 0903 and 0904 ready. Get an "edible material sheet" member 0901 ready. Put the three pieces of "meat based material" sheets on the "edible material sheet" member. Roll the "edible material" sheet together with the members of 0902, 0903 and 0904 to make a cylindrical stick. Put the rolled stick into a CYLINDER-shaped-cavity pressing mold and then press it. The aim of pressing is to make the product in a permanent structure and longer-lasting chewing for pets. A small part of every three "meat based material" sheet members may be exposed as shown in FIG. 9 after being wrapped. Alternatively, the "edible material member" 0901 as the outer layer of the product is "plant and meat based material" chewy sheet comprising 20%-50% plant and 5%-33% meat ingredient.

Figure 10:
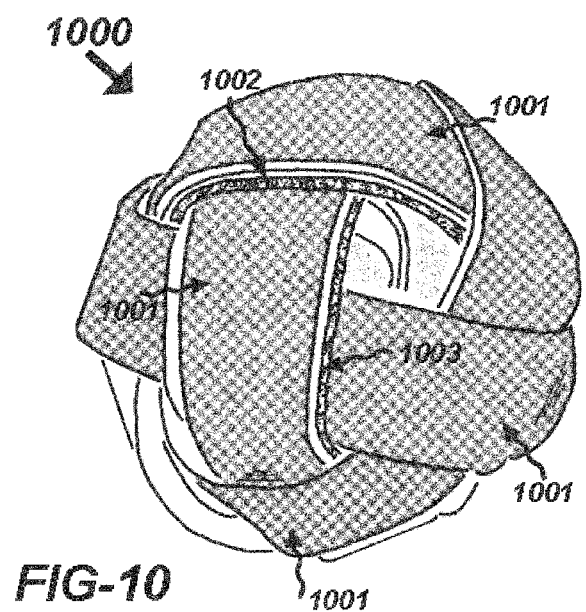
FIG. 10 is an elevational view of another embodiment of a pet chew assembled with an outer layer member of a few pieces of "edible material" and another member of a few pieces of "meat based material" chewy sheets cut from the large chewy sheet of FIG. 1, resembling a ball shape.

As shown in FIG. 10, an embodiment of present invention. An alternate shaped Pet Chew 1000 is formed looking like a ball shape. Processes include, get several small properly-sized rectangular chewy sheets of "edible material" 1001 ready. Get four pieces of "meat based material" chewy sheet member ready (member 1002 and 1003 visible in this figure are two of the four members). Assemble the several small "edible material" chewy sheets and the four pieces of "meat based material" chewy sheet members together to have it structured to a ball shell with hollow core inside. Position of 1002 and 1003 is as shown in FIG. 10. Alternatively, the "edible material" sheets serving as outer layer of the product are animal hide based sheet with over 50% rawhide ingredient in the formula.

Here is another aspect of present invention. In this aspect, the edible pet chew includes a first THREE-DIMENSIONAL-SHAPE chewy member of "meat based material" and a second member of "edible material", wherein the second "edible material" member is positioned in, or distributed in or wrapped by the first "meat based material" member. The three-dimensional-shape chewy member preferably serves as outer shell or outer casing or outer layer of this pet chew. Alternatively the three-dimensional-shape chewy member is in a chewy mass structure. The "meat based material" includes at least 33.3% meat ingredient by weight on an "as formulated" basis, and less than 50% (more typically 15%-50%) plant ingredient by weight. The three-dimensional-shape form of the "meat based material" member is preferably obtained by extruding a "meat based material" composition with an extruder. Furthermore, preferably the "meat based material" composition is treated by heating to at least 40° C. before its being extruded at the extruder die to a three-dimensional-shape form, typically during the extruding process within the extruder. Preferably, the edible pet chew product is formed by co-extrusion process, co-extruding the first "meat based material" and the second "edible material" together. Preferably, the outer layer (or outer casing) of the edible pet chew is formed primarily by the first member, wherein over 50% by area of the outer layer of the edible pet chew is the first member. Alternatively, the outer layer of the edible pet chew is the first member.

In this aspect, preferably a first member of "meat based material" three-dimensional-shape chewy member servers as an outer layer member of the edible pet chew primarily. A second member of edible material is introduced herein, being wrapped by the "meat based material" chewy member. The second member of "edible material" may bring at least one of the four advantages as described as follows. (i), Improve the palatability of the edible pet chew. The outer layers have plant ingredient in the formula, which is assumed not perfectly attractive. The second member of "edible material member" wrapped in may provide additional attraction to dogs, thus enhancing the palatability of the edible pet chew product. (ii), Provide additional nutrition for dogs. (iii), Create visual attractions for consumers. Generally, the second member of "edible material" will have a different coloring or looking from that of the first member, thus generating layering effect of the edible pet chew attractive to consumers. (iv), In the circumstance that the edible material member is formulated more palatable than the outer meat based material member, the presence of the edible material member can additionally encourage dogs to chew and the dogs will eat starting with the outer layer member before their reaching the inner edible material member. Dogs will be more attracted by the edible material member wrapped therein but they can't reach it unless they ingest the "meat based material" outer layer. In this pattern, the pet chew achieves consistent attraction to dogs during their chewing time. (iv), material with lower cost versus the meat based material, thus lowering the whole product cost level.

Preferably in this aspect, the second member of "edible material" is wrapped in by the three-dimensional-shape "meat based material" chewy member, wherein at least a portion of the "edible material member" is covered by the "meat based material" chewy member without exposure. The edible material member wrapped in by the "meat based material" chewy member can be completely covered by the outer layer without any exposure or be partially covered with a portion exposed. Alternatively, the proportion of "meat based material" chewy member to "edible material" member wrapped therein by weight is in the range between 1:20 and 20:1.

Preferably in this aspect, the first chewy member of three-dimensional-shape "meat based material" forms the primary structure of the edible pet chew and the outer layer of the edible pet chew is primarily formed by the "meat based material" member. Alternatively, the proportion of "meat based material" outer layer chewy member to "edible material" member wrapped therein by weight is in the range between 1:5 and 20:1.

Preferably in this aspect, the member of "edible material" wrapped in the "meat based material" three-dimensional-shape outer layer is formed from the material selected from the group consisting of: a plant based material, a traditional animal hide sheet or a traditional rawhide sheet, an animal hide based material with over 50% animal hide ingredient, a "plant and meat based material" comprising 20%-50% plant ingredient and 5%-33% meat ingredient by weight, a jerky, a meat based material, and a "plant and animal hide based" material sheet comprising 25%-50% plant ingredient and at least 25% animal hide ingredient. Preferably, the member of edible material wrapped in is in a three-dimensional-shape form.

In an embodiment of present invention within this aspect, the edible pet chew includes an outer layer of "meat based material" three-dimensional-shape chewy member and a "plant and meat based material" member wrapped therein. Preferably the "plant and meat based material" member is an extruded one. The "plant and meat based material" chewy member wrapped therein has 20%-50% plant ingredient and 5%-33% meat ingredient by weight. In this embodiment, the chewy member of "plant and meat based material" has 5%-33% meat, which is comparatively more cost economical than the material having over 33.3% meat.

In another embodiment of present invention within this aspect, the edible pet chew includes an outer layer of "meat based material" three-dimensional-shape chewy member and a plant based material member wrapped therein. The plant based material chewy member wrapped therein has over 50% plant ingredient by weight.

In another embodiment of present invention within this aspect, the edible pet chew includes an outer layer of "meat based material" three-dimensional-shape chewy member and an animal hide based material member wrapped therein, wherein the animal hide based material has over 50% animal hide ingredient in the formula. The animal hide based material member as a very nice chewy member extends chewing time and enhances the chewing function of the edible pet chew.

In another embodiment of present invention within this aspect, the edible pet chew includes an outer layer of "meat based material" three-dimensional-shape chewy member and another "meat based material" member wrapped therein.

Alternatively in this aspect, the member of edible material wrapped in the "meat based material" three-dimensional-shape outer layer is a jerky. It should be noted that the term "jerky" is defined in present invention as dried meat, wherein the meat ingredient is selected from the group consisting of: animal flesh, animal muscle, animal fat, poultry meat, chicken, chicken breast, duck, goose, turkey, poultry by product, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart, animal pizzle, meat meal, chicken meal, fish meal, meat by-product meal, poultry by-product meal, meat derived ingredient, poultry derived ingredient, meat by-product derived ingredient and poultry by-product derived ingredient. The process to get the jerky includes: (i) separate the fresh meat from a slaughtered animal (ii) the fresh meat may be sliced into strips, or be ground to slurry, or be dried then ground to dried meat meal form. (iii) The meat may be added with plant ingredient for example plant protein, or glycerin, or salt, or sugar before the meat being dried. Typically the meat ingredient percentage in the jerky is at least 50% by weight on a finished product basis. (iv) Dry the meat by heating. Moisture content of the dried meat is not greater than 18%.

The preferred embodiments of the present invention as shown in FIG. 21 through FIG. 22 are developed within this aspect of the present invention.

Now refer to FIG. 21. As shown in FIG. 21, an embodiment of present invention. An alternate shaped Pet Chew 2100 is formed looking like a triangular stick. 2101 is a "meat based material" chewy member serving as outer layer of the product primarily. 2102 is an "edible material" member wrapped by 2101 with a portion of 2102 being covered by 2101. A preferred processes include, get a first "meat based material" composition and a second "edible material" composition ready. Deliver the compositions into a co-extrusion extruder. After co-extrusion process, the final structure/shape of the edible pet chew is established. Last step, have the product dried by heating. Alternatively, the "edible material" member being wrapped therein is a plant based material having over 50% plant ingredient in the formula.

As shown in FIG. 22, an embodiment of present invention. An alternate shaped Pet Chew 2200 is formed looking like a cylindrical stick. 2201 is a "meat based material" chewy member serving as outer layer of the product primarily. 2202 is an "edible material" member wrapped by 2201 with a portion of 2202 being covered by 2201. A preferred processes include, get a first "meat based material" composition and a second "edible material" composition ready. Deliver the compositions into a co-extrusion co-extruder. After co-extrusion process, the final structure/shape of the edible pet chew is established. Last step, have the product dried by heating. Alternatively, the "edible material" member being wrapped therein is an animal hide based material having over 50% animal hide ingredient in the formula.

Here comes another aspect of present invention. In this aspect, the edible pet chew includes a first member of "edible material" and a second member of "meat based material" THREE-DIMENSIONAL-SHAPE chewy member, wherein the second member is positioned in, or distributed in or wrapped by the first member, wherein the first member is free of a plant based material member. Under the concern of palatability, the first member is required to be free of a plant based material member. The "edible material" member preferably serves as outer shell or outer casing or outer layer of this pet chew. Alternatively the three-dimensional-shape chewy member is in a chewy mass structure. The "meat based material" includes at least 33.3% meat ingredient by weight on an "as formulated" basis, and less than 50% (more typically 15%-50%) plant ingredient by weight. The three-dimensional-shape form of the "meat based material" member is preferably obtained by extruding a "meat based material" composition with an extruder. Furthermore, preferably the "meat based material" composition is treated by heating to at least 40° C. before its being extruded at the extruder die to a three-dimensional-shape form, typically during the extruding process within the extruder. Preferably, the edible pet chew product is formed by co-extrusion process, co-extruding the first "edible material" and the second "meat based material" together. Preferably, the outer layer (or outer casing) of the edible pet chew is formed primarily by the first member, wherein over 50% by area of the outer layer of the edible pet chew is the first member. Alternatively, the outer layer of the edible pet chew is the first member.

In this aspect, the second three-dimensional-shape chewy member of "meat based material" is wrapped in by the first member of "edible material". Edible pet chew of this aspect provides the following advantages. The presence of the "meat based material" chewy member serves as attractant member in the edible pet chew, which encourages dogs to chew on since dogs like the meat ingredient formulated therein. Dogs will eat starting with the first "edible material" member before their reaching the "meat based material" chewy member. Dogs will be well attracted by the "meat based material" member wrapped therein but they can't reach the "meat based material" member unless they ingest the first "edible material" member. In this pattern, the pet chew under this aspect achieves consistent attraction to dogs during their chewing time.

In this aspect, preferably the first member of "edible material" is free of a plant based material member. Our tests indicate that when plant ingredient being >50% by weight in a member, plant ingredient will be the primary ingredient in the it, which makes the member inherently NOT good in palatability performance and not attractive to dogs. Therefore the first member of "edible material" in this aspect is free of a plant based material member, wherein the plant based material member has over 50% plant ingredient in the member by weight.

In this aspect, preferably the first member of "edible material" servers as the outer layer of the edible pet chew primarily. The "meat based material" three-dimensional-shape chewy member is wrapped by the "edible material" member. The introduction of the first member of "edible material" outer layer may bring at least one of the four advantages as described as follows. (i), Provide additional nutrition for dogs. (ii), Create visual attractions for consumers. Generally the first member of "edible material" will have a different coloring or looking that of the "meat based material" member wrapped in, thus generating layering effect of the edible pet chew attractive to consumers. (iii), Extend chewing time and enhance chewing function of an edible pet chew. (iv), material with lower cost versus the meat based material, thus lowering the whole product cost level.

Preferably in this aspect, the "meat based material" three-dimensional-shape chewy member is wrapped in the "edible material" outer layer member, wherein at least a portion of the "meat based material" chewy member is covered by the "edible material" outer layer member without exposure. The "meat based material" chewy member wrapped in by the "edible material" can be completely covered by the outer layer without any exposure or be partially covered with a portion exposed. Alternatively, the proportion of "edible material" outer layer member to the "meat based material" chewy member wrapped therein by weight is in the range between 1:20 and 20:1.

Preferably in this aspect, the first member of "edible material" forms the primary structure of the edible pet chew and the outer layer of the edible pet chew is primarily formed by the "edible material" member. Alternatively, the proportion of the member of "edible material" outer layer to the member of "meat based material" wrapped therein by weight is in the range between 1:5 and 20:1.

Preferably in this aspect, the outer layer member of "edible material" wrapping the "meat based material" three-dimensional-shape member is formed from the material selected from the group consisting of: a traditional animal hide sheet or a rawhide sheet, an animal hide based material, a "plant and meat based material" comprising 20%-50% plant and 5%-33% meat ingredient by weight, a "meat based material" chewy member having at least 33.3% meat ingredient by weight on an "as formulated" basis, and a "plant and animal hide based" material sheet comprising 25%-50% plant ingredient and at least 25% animal hide ingredient. Preferably, the member of edible material is in a three-dimensional-shape form.

Alternatively in this aspect of present invention, the first member of the "edible material" is free of a traditional animal hide sheet, intending to reduce the disadvantages of known rawhide material as mentioned in above paragraphs.

In an embodiment of present invention within this aspect, the edible pet chew includes an outer layer member of animal hide based material and a "meat based material" three-dimensional-shape chewy member wrapped therein. The animal hide based material member comprises at least 50% animal hide ingredients (typically rawhide materials) by weight in its formula. The animal hide based material member, as a pretty-chewy member, significantly extends chewing time and enhances the chewing function of the edible pet chew. Alternatively with this embodiment, the material of the "meat based material" chewy member comprises: at least 33.3% traditional meat by-product ingredient by weight on an "as formulated" basis and less than 50% (more typically 15%-50%) plant ingredient by weight.

In another embodiment of present invention within this aspect, the edible pet chew includes an outer layer of "plant and meat based material" member and a "meat based material" three-dimensional-shape chewy member wrapped therein. Preferably the "plant and meat based material" member is an extruded three-dimensional-shape member. The "plant and meat based material" chewy member wrapped therein has 20%-50% plant ingredient by weight and 5%-33% meat ingredient by weight. In this embodiment, the chewy member of "plant and meat based material" has 5%-33% meat, which is comparatively more cost economical than the material having over 33.3% meat.

Figure 23:
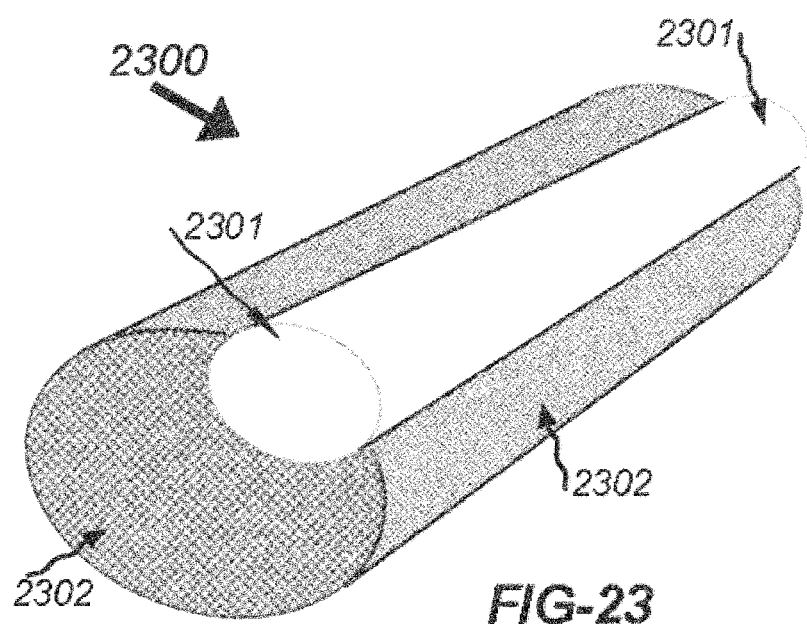
FIG. 23 is an elevational view of an embodiment of a pet chew formed from a member of "edible material" and another three-dimensional-shape chewy member of "meat based material" wrapped by the "edible material" member, looking like a stick.
Figure 24:
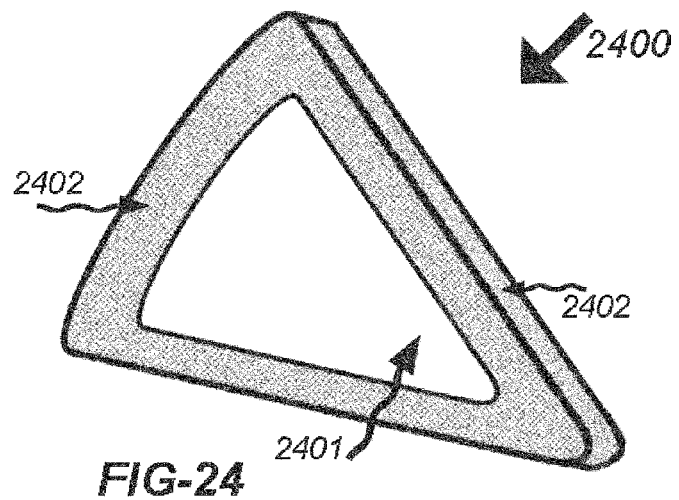
FIG. 24 is an elevational view of an embodiment of a pet chew formed from a member of "edible material" and another three-dimensional-shape chewy member of "meat based material" wrapped by the "edible material" member, looking like a triangular chip.

The preferred embodiments of the present invention as shown in FIG. 23 through FIG. 24 are developed within this aspect of the present invention.

Now refer to FIG. 23. As shown in FIG. 23, an embodiment of present invention. An alternate shaped Pet Chew 2300 is formed looking like a stick. 2302 is an "edible material" member serving as outer layer of the product primarily. 2301 is a "meat based material" three-dimensional-shape member wrapped by 2302 with a portion of 2301 being covered by 2302. A preferred processes include, get a first "edible material" composition and a second "meat based material" composition ready. Deliver the compositions into a co-extrusion co-extruder. After co-extrusion process, the final structure/shape of the edible pet chew is established. Last step, have the product dried by heating. Alternatively, the "edible material" member is an animal hide based material having over 50% rawhide ingredient in the formula.

As shown in FIG. 24, an embodiment of present invention. An alternate shaped Pet Chew 2400 is formed looking like a dual-colored chip. 2402 is an "edible material" member serving as outer layer of the product primarily. 2401 is a "meat based material" three-dimensional-shape member wrapped by 2402 with a portion of 2401 being covered by 2402. A preferred processes include, get a first "edible material" composition and a second "meat based material" composition ready. Deliver the compositions into a co-extrusion co-extruder. After co-extrusion process, cut the extruded material to small chips and thus the final structure/shape of the edible pet chew is established. Last step, have the product dried by heating. Alternatively, the "edible material" member is a "plant and meat based material" having 20%-50% plant ingredient and 5%-33% meat ingredient by weight in the formula.

Here comes another aspect of the present invention. In this aspect, it provides a preferred process for forming an edible pet chew with a "meat based material" chewy sheet as an essential member of it. The process includes:

(i). Prepare meat ingredient, for example fresh meat or frozen meat (fresh/frozen meat typical moisture content is 65%-85%). The weights of ingredients are determined as they are added in the formula, including their inherent water content. Meat ingredient in the whole formula of the "meat based material" is at least 33.3% by weight on an "as formulated" basis.

(ii). Pretreat the fresh meat or frozen meat intended to partially remove its moisture either by Pretreatment "A" or alternatively Pretreatment "B". Pretreatment A includes: drying and grinding; Dry the fresh meat or frozen meat to dried meat (dried meat typical moisture <16%); Grind the dried meat to meat meal (meat meal typical moisture <16%). Pretreatment B includes: Grind the fresh meat or frozen meat to ground meat with moisture content of 65%-85%; Partially remove moisture content of the ground meat from inherently 65%-85% to a lower moisture content. This step (ii) can be done either by the edible pet chew manufacturer or by meat raw material supplier for the edible pet chew manufacturer.

(iii). Form a "meat based material" composition by mixing the meat meal or ground meat with moisture partially removed from step (ii) with plant material, and other materials together.

(iv). Deliver the composition into an extruder via its hopper, and heat the composition in the extruder at a high temperature at least 40° C., more typically 75° C. to 150° C., before its being extruded at the extruder die to a sheet form, typically during the extruding process within the extruder. Extrude the composition with the extruder. After the composition leaves from the extruder die, a long sheet of "meat based material" in initially large size is formed. The typical thickness of the sheet ranges from 0.1 mm to 5 mm (more typically 0.5 mm to 2.5 mm) which is determined by the extruder die.

(v). Cut the long sheet to a number of smaller sheets with pre-determined smaller size(s).

(vi). Form the smaller sized sheet typically by manipulating to a structure or form of a finished dog chew product. Preferably the smaller sized sheet is assembled with another edible material member to form the structure or form of the finished dog chew product.

As an alternative embodiment of this step, when assembling, an edible material member is wrapped in by the smaller sized sheet. As another alternative embodiment of this step, when assembling, the smaller sized sheet is wrapped in by an edible material member.

(vii). Dry and harden the product by heating it at around 45° C.-65° C., for example 55° C., for sufficient time and obtain a final finished dog chew product. Moisture content of the sheet component in final finished products is typically 8%-18% (more typically 12%-16%). Moisture content of the final finished product is typically 8%-18% (more typically 12%-16%).

Here comes another aspect of the present invention. In this aspect, it provides a preferred process for forming an edible pet chew with a THREE-DIMENSIONAL-SHAPE "meat based material" chewy member as an essential member of it. The process includes:

(i). Prepare meat ingredient, for example fresh meat or frozen meat (fresh/frozen meat typical moisture content is 65%-85%). The weights of ingredients are determined as they are added in the formula, including their inherent water content. Meat ingredient in the whole formula of the "meat based material" is at least 33.3% by weight on an "as formulated" basis.

(ii). Pretreat the fresh meat or frozen meat intended to partially remove its moisture either by Pretreatment "A" or alternatively Pretreatment "B". Pretreatment A includes: drying and grinding; Dry the fresh meat or frozen meat to dried meat (dried meat typical moisture <16%); Grind the dried meat to meat meal (meat meal typical moisture <16%). Pretreatment B includes: Grind the fresh meat or frozen meat to ground meat with moisture content of 65%-85%; Partially remove moisture content of the ground meat from inherently 65%-85% to a lower moisture content. This step (ii) can be done either by the edible pet chew manufacturer or by meat raw material supplier for the edible pet chew manufacturer.

(iii). Form a "meat based material" composition by mixing the meat meal from step (ii) with plant material, and other materials together.

(iv). Form another "edible material" composition, for example an animal hide based material composition having at least 50% rawhide ingredient in the formula.

(v). Deliver the compositions from step (iii) and (iv) into an co-extrusion extruder via its hopper, and heat the compositions in the extruder at a high temperature at least 40° C., more typically 75° C. to 150° C., before their being extruded at the extruder die to a three-dimensional form, typically during the extruding process within the extruder. Extrude the compositions with the extruder. After the compositions leaves from the extruder die, a long extruded material in initially large size is formed. Alternatively, in the extruded material, the "meat based material" member serves as an outer layer. Also alternatively, in the extruded material, the "edible material" member serves as an outer layer.

(vi). Cut the long extruded material to a number of smaller sized ones with finished product form.

(vii). Dry and harden the product from step (vi) by heating it at around 45° C.-65° C., for example 55° C., for sufficient time and obtain a final finished dog chew product. Moisture content of the three-dimensional-shape component in final finished products is typically 8%-18% (more typically 12%-16%). Moisture content of the final finished product is typically 8%-18% (more typically 12%-16%).

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An edible pet chew, comprising:
a chewy sheet of meat based material, wherein said meat based material comprises at least 33.3% meat ingredient on an as formulated basis by weight in the formula and 0.1%-49.9% plant ingredient on an as formulated basis by weight in the formula, wherein percentage of said meat ingredient by weight in the formula of said meat based material is determined as said meat ingredient is added in the formula, wherein said percentage of said meat ingredient by weight in the formula of said meat based material is determined as inherent water content of said meat ingredient is counted, wherein percentage of said plant ingredient by weight in the formula of said meat based material is determined as said plant ingredient is added in the formula, wherein said percentage of said plant ingredient by weight in the formula of said meat based material is determined as inherent water content of said plant ingredient is counted.

2. The edible pet chew, as recited in claim 1, wherein said meat based material further comprises an additive, wherein said additive is used to provide said chewy sheet of meat based material sufficient rigidity and strength.

3. The edible pet chew, as recited in claim 1, wherein said meat ingredient is selected from the group consisting of animal flesh, animal muscle, animal fat, poultry meat, chicken, chicken breast, duck, goose, turkey, poultry by product, porcine meat, porcine meat by-product, pork, bovine meat, bovine meat by-product, beef, mutton, lamb, goat meat, fish, animal viscera, animal stomach, animal tongue, animal kidney, animal intestines, animal spleen, animal liver, animal lung, animal heart, animal pizzle, meat meal, chicken meal, fish meal, meat by-product meal, poultry by-product meal, meat derived ingredient, poultry derived ingredient, meat by-product derived ingredient, gelatin and poultry by-product derived ingredient.

4. The edible pet chew, as recited in claim 1, wherein percentage of said meat ingredient by weight in the formula of said meat based material is determined as said meat ingredient is added in the formula, wherein said percentage of said meat ingredient by weight in the formula of said meat based material is determined as inherent water content of said meat ingredient is counted, wherein percentage of said plant ingredient by weight in the formula of said meat based material is determined as said plant ingredient is added in the formula, wherein said percentage of said plant ingredient by weight in the formula of said meat based material is determined as inherent water content of said plant ingredient is counted.

5. The edible pet chew, as recited in claim 1, wherein said meat ingredient is fresh meat, wherein said fresh meat has over 50% inherent water content by weight, wherein said fresh meat is selected from the group consisting of fresh traditional meat, fresh chicken, fresh poultry meat, fresh meat by-product and fresh poultry by-product.

6. The edible pet chew, as recited in claim 5, wherein said fresh meat is pretreated to dried ground meat meal to form said meat based material composition, wherein said pretreatment includes drying and grinding processes.

7. The edible pet chew, as recited in claim 5, wherein said fresh meat is pretreated to ground meat to form said meat based material composition, wherein said pretreatment includes grinding process and the process of partially removing inherent moisture content of said fresh meat.

8. The edible pet chew, as recited in claim 1, wherein said meat ingredient is frozen meat, wherein said frozen meat has over 50% inherent water content by weight, wherein said frozen meat is selected from the group consisting of frozen traditional meat, frozen chicken, frozen poultry meat, frozen meat by-product and frozen poultry by-product.

9. The edible pet chew, as recited in claim 8, wherein said frozen meat is pretreated to dried ground meat meal to form said meat based material composition, wherein said pretreatment includes defrosting, drying and grinding processes.

10. The edible pet chew, as recited in claim 8, wherein said frozen meat is pretreated to ground meat to form said meat based material composition, wherein said pretreatment includes defrosting and grinding process and the process of partially removing inherent moisture content of said fresh meat.

11. The edible pet chew, as recited in claim 1, wherein said plant ingredient is selected from the group consisting of a plant material, a plant derived material, a plant protein and a plant starch, wherein said meat based material comprises 15%-49.9% plant ingredient on an as formulated basis by weight in the formula.

12. The edible pet chew, as recited in claim 1, wherein said meat based material further comprises 0.1%-20% animal hide ingredient by weight in the formula.

13. The edible pet chew, as recited in claim 1, wherein said meat based material is free of animal hide material and bone material.

14. The edible pet chew, as recited in claim 1, wherein said meat based material further comprises 0.1%-4.9% bone material by weight.

15. The edible pet chew, as recited in claim 1, wherein said chewy sheet is folded or rolled longitudinally and is knotted at first and second longitudinal ends, wherein said first and second longitudinal ends have knots thereat respectively.

16. The edible pet chew, as recited in claim 1, further comprising a member of edible material, wherein said edible material member is wrapped in said chewy sheet member, wherein at least a portion of said edible material member is covered by said chewy sheet member.

17. The edible pet chew, as recited in claim 16, wherein said edible pet chew comprises an outer layer and an inner member, wherein said outer layer is primarily formed by said meat based material chewy sheet member.

18. The edible pet chew, as recited in claim 16, wherein said edible material member is in a sheet form.

19. The edible pet chew, as recited in claim 17, wherein said edible material is a material selected from the group consisting of a plant based material comprising over 50% plant ingredient by weight, a traditional animal hide sheet, a traditional rawhide sheet, an animal hide based material comprising at least 50% animal hide ingredient by weight, a plant and meat based material comprising 20%-50% plant ingredient and 5%-33% meat ingredient by weight, a jerky, a plant and animal hide based material comprising 25%-50% plant ingredient and at least 25% animal hide ingredient by weight, and a meat based material comprising at least 33.3% meat ingredient by weight.

20. The edible pet chew, as recited in claim 16, wherein said meat based material and said edible material is pretreated by a co-extrusion process to form a multiple layer material before being formed to finished product form, wherein said multiple layer material comprises a layer of meat based material sheet and a layer of edible material sheet, wherein said meat based material sheet and said edible material sheet adhere to each other firmly.

21. The edible pet chew, as recited in claim 16, wherein said meat based material member and said edible material member are assembled, folded or rolled longitudinally and knotted at first and second longitudinal ends, wherein said first and second longitudinal ends have knots thereat respectively.

22. The edible pet chew, as recited in claim 1, further comprising a member of edible material, wherein said edible material member is free of a plant based material sheet, wherein said meat based material chewy sheet member is wrapped in said edible material member, wherein at least a portion of said meat based material chewy sheet member is covered by said edible material member.

23. The edible pet chew, as recited in claim 22, wherein said edible pet chew comprises an outer layer and an inner member, wherein said outer layer is primarily formed by said edible material member.

24. The edible pet chew, as recited in claim 22, wherein said edible material member is in a sheet form.

25. The edible pet chew, as recited in claim 23, wherein said edible material is a material selected from the group consisting of a traditional animal hide sheet, a traditional rawhide sheet, an animal hide based material comprising at least 50% animal hide ingredient, a plant and meat based material comprising 20%-50% plant ingredient and 5%-33% meat ingredient by weight, a plant and animal hide based material comprising 25%-50% plant ingredient and at least 25% animal hide ingredient by weight, and a meat based material comprising at least 33.3% meat ingredient by weight.

26. The edible pet chew, as recited in claim 22, wherein said edible material and said meat based material is pretreated by a co-extrusion process to form a multiple layer material before being formed to finished product form, wherein said multiple layer material comprises a layer of edible material sheet and a layer of meat based material sheet, wherein said edible material sheet and said meat based material sheet adhere to each other firmly.

27. The edible pet chew, as recited in claim 22, wherein said edible material member and said meat based material member are assembled, folded or rolled longitudinally and knotted at first and second longitudinal ends, wherein said first and second longitudinal ends have knots thereat respectively.

* * * * *